(12) United States Patent
Li et al.

(10) Patent No.: US 12,506,223 B1
(45) Date of Patent: Dec. 23, 2025

(54) BATTERY

(71) Applicant: ZHUHAI COSMX BATTERY CO., LTD., Zhuhai (CN)

(72) Inventors: Jiao Li, Zhuhai (CN); Jialin Fang, Zhuhai (CN)

(73) Assignee: Zhuhai Cosmx Battery Co., Ltd., Zhuhai (CN)

( * ) Notice: Subject to any disclaimer, the term of this patent is extended or adjusted under 35 U.S.C. 154(b) by 0 days.

(21) Appl. No.: 19/209,590

(22) Filed: May 15, 2025

(30) Foreign Application Priority Data

Jun. 25, 2024 (CN) .......................... 202410830610.8

(51) Int. Cl.
| | |
|---|---|
| *H01M 50/46* | (2021.01) |
| *H01M 4/02* | (2006.01) |
| *H01M 4/133* | (2010.01) |
| *H01M 4/134* | (2010.01) |
| *H01M 4/36* | (2006.01) |
| *H01M 4/38* | (2006.01) |
| *H01M 4/587* | (2010.01) |
| *H01M 50/434* | (2021.01) |
| *H01M 50/443* | (2021.01) |
| *H01M 50/446* | (2021.01) |
| *H01M 50/449* | (2021.01) |
| *H01M 50/489* | (2021.01) |

(52) U.S. Cl.
CPC ......... *H01M 50/461* (2021.01); *H01M 4/133* (2013.01); *H01M 4/134* (2013.01); *H01M 4/364* (2013.01); *H01M 4/386* (2013.01); *H01M 4/587* (2013.01); *H01M 50/434* (2021.01); *H01M 50/443* (2021.01); *H01M 50/446* (2021.01); *H01M 50/449* (2021.01); *H01M 50/489* (2021.01); *H01M 2004/021* (2013.01); *H01M 2004/027* (2013.01)

(58) Field of Classification Search
None
See application file for complete search history.

(56) References Cited

FOREIGN PATENT DOCUMENTS

| EP | 0967672 A1 * | 12/1999 | .............. H01M 4/04 |
|---|---|---|---|
| EP | 2261275 B1 * | 10/2013 | ................ C08J 5/18 |

* cited by examiner

*Primary Examiner* — Anca Eoff

(57) ABSTRACT

The disclosure provides a battery, including a first electrode plate and a separator, the first electrode plate including a first current collector and a first coating located on a surface of the first current collector. The first coating is connected to the separator; and a surface of the first coating is provided with a recess, and an air permeability S of the separator and a width L of the recess satisfy: $5000 \leq S \times L \leq 75{,}000$, where S is in sec/100 cc and L is in μm. The disclosure can improve the rate capability of the battery while reducing the voltage drop of the battery and reducing the risk of short circuit.

19 Claims, 2 Drawing Sheets

BATTERY

CROSS-REFERENCE TO RELATED APPLICATIONS

This application claims priority to Chinese Patent Application No. 202410830610.8 filed on Jun. 25, 2024, which is hereby incorporated by reference in its entirety.

TECHNICAL FIELD

The disclosure relates to the field of electrochemical devices, and in particular to a battery.

BACKGROUND

Batteries are common electrochemical devices and are widely used. A battery includes a battery cell. The battery cell includes electrode plates (a positive electrode plate and a negative electrode plate) and a separator. The positive electrode plate is separated from the negative electrode plate by the separator for preventing contact and short circuiting between the positive and negative electrodes. During charge/discharge cycling of the battery, active ions (e.g., lithium ions in a lithium-ion battery) pass through the separator, and are intercalated between the positive and negative electrodes, to achieve the charge/discharge cycling of the battery. The electrode plates and the separator are important components of the battery and are important factors affecting the rate capability, cycle life, safety and other performances of the battery.

The formation of a recess on a surface of the electrode plate by laser ablation or the like facilitates an improvement in the dynamics performance of the battery at a high areal density. However, when the recess is formed in the surface of the electrode plate by laser ablation or the like, it is likely to generate electrode powder (particulate dust), and part of the powder will remain in the formed recess. During charging/discharging of the battery, the powder remaining in the recess poses a risk of puncturing the separator, etc., causing a high voltage drop in the battery, thereby increasing the risk of short circuit and affecting the safety and other performances of the battery. Therefore, how to improve the rate capability of the battery while reducing the voltage drop of the battery is a technical problem that needs to be solved urgently by those skilled in the art.

SUMMARY

The disclosure provides a battery which can improve the rate capability of the battery while reducing the voltage drop of the battery and reducing the risk of short circuit.

In one aspect of the disclosure, there is provided a battery including a first electrode plate and a separator, the first electrode plate including a first current collector and a first coating located on a surface of the first current collector. The first coating is connected to the separator; and a surface of the first coating is provided with a recess, and an air permeability S of the separator and a width L of the recess satisfy: $5000\ \mu m \cdot sec/100\ cc \leq S \times L \leq 75{,}000\ \mu m \cdot sec/100\ cc$, where S is in sec/100 cc and L is in μm.

According to one embodiment of the disclosure, the first coating includes a first active material. The first coating includes a first sublayer, and a second sublayer located on a side of the first sublayer facing away from the first current collector, a particle size Dv50 of the first active material in the first sublayer being greater than a particle size Dv50 of the first active material in the second sublayer. The particle size Dv50 of the first active material in the first sublayer ranges from 5 to 30 μm. The particle size Dv50 of the first active material in the second sublayer ranges from 1 to 25 μm. The air permeability S of the separator, a depth h of the recess, a thickness $H_{121}$ of the first sublayer and a thickness $H_{122}$ of the second sublayer satisfy $50\ \mu m \cdot sec/100\ cc \leq S \times h \times H_{122}/H_{121} \leq 15{,}000\ \mu m \cdot sec/100\ cc$, where S is in sec/100 cc and h is in μm, $0.1 \leq H_{122}/H_{121} \leq 1$. The first active material in the first sublayer includes graphite and/or a silicon-based material. The first active material in the second sublayer includes graphite and/or a silicon-based material.

According to one embodiment of the disclosure, the first coating includes a first active material, the first active material including a silicon-based material and/or graphite. A spacing ΔL between two adjacent recesses, the width L of the recess, and a mass ration of the silicon-based material to the graphite of the first coating satisfy $0.015 \leq \Delta L/(L \times \eta) \leq 3$, where ΔL is in mm, and L is in μm. In the first active material, the mass ratio η of the silicon-based material to the graphite ranges from 1% to 30%. The silicon-based material includes one or more of a silicon-carbon material, a silicon-oxygen material, elemental silicon, and a silicon alloy. The graphite includes artificial graphite and/or natural graphite. The first active material includes a silicon-carbon material, and a mass ratio a of silicon to carbon of the silicon-carbon material and a depth h of the recess satisfy $0.004 \leq a/h \leq 0.2$, where h is in μm, $0.1 \leq a \leq 0.9$.

According to one embodiment of the disclosure, a depth h of the recess and the elongation at break e of the separator satisfy $4 \leq h/e \leq 250$, where h is in μm, $10\% \leq e \leq 100\%$.

According to one embodiment of the disclosure, the separator includes a base film, and a spacing ΔL between two adjacent recesses and a thickness H31 of the base film satisfy $2.1 \leq \Delta L \times H31 \leq 15$, where ΔL is in mm and H31 is in μm. The thickness H31 of the base film ranges from 2 to 15 μm. The spacing ΔL between the two recesses ranges from 0.3 to 3 mm.

According to one embodiment of the disclosure, the first coating is bonded to the separator. The separator includes a base film, and a first adhesive layer located on a side of the base film facing the first electrode plate. A depth h of the recess and a thickness H33 of the first adhesive layer satisfy $1 \leq h/2H33 \leq 60$. The thickness H33 of the first adhesive layer ranges from 0.25 to 2.5 μm.

According to one embodiment of the disclosure, the battery further includes a second electrode plate having an opposite polarity to the first electrode plate, the separator being located between the first electrode plate and the second electrode plate. the separator comprises a base film, a first adhesive layer located on a side of the base film facing the first electrode plate, a ceramic layer located on a side of the base film facing away from the first electrode plate, and a second adhesive layer located on a side of the ceramic layer facing the second electrode plate; and a thickness H31 of the base film, a thickness H32 of the ceramic layer and a spacing ΔL between two adjacent recesses satisfy: $2 \leq \Delta L \times (H31+H32) \leq 25$, the thickness H32 of the ceramic layer ranges from 0.5 to 5 μm. The thickness H31 of the base film ranges from 2 to 15 μm. The ceramic layer includes ceramic particles and a third binder, the third binder including one or more of polyvinylidene fluoride, polyvinylidene fluoride-hexafluoropropylene copolymer, and polymethyl methacrylate. A particle size Dv95 of the ceramic particles and the width L of the recess satisfy: $25 \leq L/Dv95 \leq 1500$. The particle size Dv95 of the ceramic particles ranges from 0.1 to 2 μm. The ceramic particles of the ceramic layer have a percentage by mass of 50% to 99.8%. The ceramic particles include one or more of alumina, boehmite, magnesium oxide, magnesium hydroxide, and titanium oxide.

According to one embodiment of the disclosure, 100 sec/100 cc≤S≤550 sec/100 cc; and/or the width of the recess ranges from 50 μm to 160 μm; and/or a depth of the recess ranges from 3 μm to 40 μm; and/or a spacing between recesses ranges from 0.3 to 3 mm.

According to an embodiment of the disclosure, the surface of the first coating includes at least one recess group, each recess group including at least two recesses distributed in a first direction. The surface of the first coating includes at least two recess groups, the at least two recess groups being distributed in a second direction intersecting the first direction. A distance between the recesses of one recess group of two adjacent recess groups and the recesses of the other recess group in the second direction is less than or equal to 1 mm. The first direction is parallel to a length direction of the first coating. The second direction is parallel to a width direction of the first coating.

According to one embodiment of the disclosure, the first electrode plate is a negative electrode plate. The battery further includes a positive electrode plate, the separator being located between the negative electrode plate and the positive electrode plate; the negative electrode plate includes at least one first flat region and a first bent region connected to the first flat region; the positive electrode plate includes at least one second flat region and a second bent region connected to the second flat region; and the first flat region and the second flat region are arranged in a stack. The positive electrode plate is bonded to the separator. A peel force between the positive electrode plate and the separator ranges from 1 to 20 N/m.

In the battery according to the disclosure, by providing the recess in the surface of the first coating, and controlling the width of the recess and the air permeability of the separator to satisfy 5000 μm·sec/100 cc≤S×L≤75,000 μm·sec/100 cc, it is possible to improve the rate capability of the battery, to improve the dynamics performance of the battery (which, specifically, may be expressed that the 5 C constant current charging rate of the battery is effectively increased), and to reduce the voltage drop of the battery while reducing the risk of short circuit, thereby improving the safety, cycle life and other performances of the battery.

Figure 1:
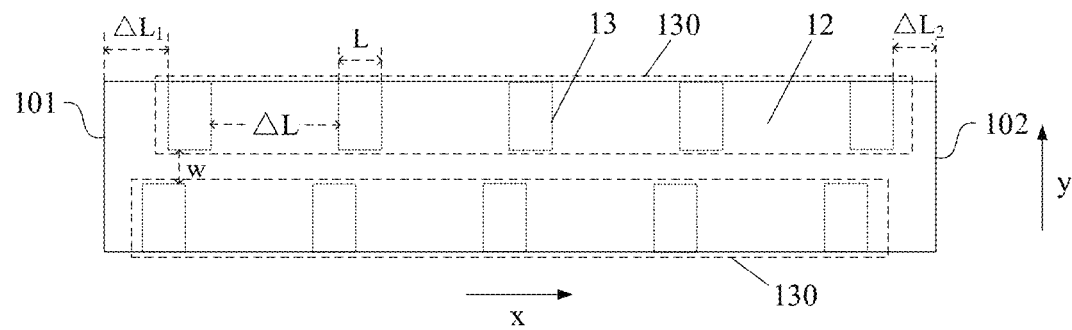
FIG. 1 is a structural schematic view of a projection of a first coating on a first current collector according to one embodiment of the disclosure.

List of reference signs: 1: First electrode plate; 11: First current collector; 12: First coating; 121: First sublayer; 122: Second sublayer; 101: First side; 102: Second side; 13: Recess; 130: Recess group; 110: First flat region; 120: First bent region; 100: First tab; 2: Second electrode plate; 21: Second current collector; 22: Second coating; 200: Second tab; 210: Second flat region; 220: Second bent region; 3: Separator; 31: Base film; 32: Ceramic layer; 33: First adhesive layer; 34: Second adhesive layer; 301: Spacing portion; 302: Extension portion; L: Width of the recess; ΔL: Spacing between two adjacent recesses; h: Depth of the recess; ΔL1: Distance between a recess closest to an outer edge of a first side of the first coating and the outer edge of the first side of the first coating; ΔL2: Distance between a recess closest to an outer edge of a second side of the first coating and the outer edge of the second side of the first coating; w: Distance between recesses of two adjacent recess groups in a second direction y; x: First direction; y: Second direction; z: Third direction.

DETAILED DESCRIPTION OF EMBODIMENTS

In order to make the solutions of the disclosure better understood by those skilled in the art, the disclosure will be further described below. The specific embodiments listed below are merely used for describing the principles and features of the disclosure. The examples given are only used for explaining the disclosure and are not intended to limit the scope of the disclosure. Based on the embodiments of the disclosure, all other embodiments obtained by those of ordinary skill in the art without creative efforts fall within the scope of protection of the disclosure.

The embodiments of the disclosure provide a battery, including a first electrode plate 1 and a separator 3, as shown in FIGS. 1 to 5. The first electrode plate 1 includes a first current collector 11, and a first coating 12 located on a surface of the first current collector 11. The first coating 12 is connected to the separator 3. The surface of the first coating 12 is provided with a recess 13, and an air permeability S of the separator 3 and a width L of the recess 13 satisfy: 5000 μm·sec/100 cc≤S×L≤75,000 μm·sec/100 cc, where S is in sec/100 cc and L is in μm.

According to the research analysis by the inventors, the air permeability S of the separator 3 represents the ability of air to pass through the material of the separator 3 per unit time. The shorter the time required for a unit flow of air to pass through the separator 3, the larger the pore size of the separator 3, the shorter the time required for active ions such as lithium ions to be transmitted at an interface of the separator 3, and the better the transmission of active ions such as lithium ions. Conversely, the longer the time required for a unit flow of air to pass through the separator 3, the smaller the pore size of the separator 3, representing, to some extent, that the longer the time required for active ions such as lithium ions to be transmitted at the interface of the separator 3, and the more unfavorable to the transmission of active ions such as lithium ions. In addition, the separator 3 is connected to the first coating 12, and after the recess 13 is provided in the surface of the first coating 12, powder (mainly powder formed by the first coating 12) remains in the recess 13 due to factors such as the formation process for the recess 13. In order to avoid the problem of the powder puncturing the separator due to the powder remaining in the recess 13, which in turn causes an increase in the voltage drop of the battery, it is necessary to coordinate and adapt the relevant parameters of the separator 3 and the recess 13 provided in the surface of the first coating 12 connected to the separator. The inventors have found after long-term research that if S×L is too small (<5000 μm·sec/100 cc), the 5 C constant current charging rate of the battery is low (less than 55%) and exhibits a poor rate capability (dynamics performance); and if S× L is too large (>75,000 μm·sec/100 cc), the voltage drop of the battery is large (above 0.02), the risk of short circuit is high. By providing the recess 13 in the surface of the first coating 12, and controlling the width L of the recess 13 and the air permeability S of the separator 3 to satisfy 5000 μm·sec/100 cc≤ S×L≤75,000 μm·sec/100 cc, it is possible to increase the 5 C constant current charging rate of the battery (the 5 C constant current charging rate of the battery can reach 60% or more (i.e., greater than or equal to 60%)), to improve the dynamics performance of the battery, and to reduce the voltage drop of the battery (the voltage drop of the battery does not exceed 0.018 (i.e., less than or equal to 0.018)) while reducing the risk of short circuit, thereby improving the safety, cycle life and other performances of the battery.

Further, the 5 C constant current charging rate of the battery may be greater than or equal to 65%, or greater than or equal to 68%, or greater than or equal to 70%, or greater than or equal to 75%, or greater than or equal to 80%.

Further, the voltage drop of the battery may be less than or equal to 0.015, or less than or equal to 0.01, or less than or equal to 0.008, or less than or equal to 0.005, or less than or equal to 0.003.

In the embodiments of the disclosure, for methods for testing the 5C constant current charging rate and the voltage drop of the battery can be found in the following specific embodiments, and will not be described in detail here.

By way of example, S×L may be 5000 μm·sec/100 cc, 8000 μm·sec/100 cc, 10,000 μm·sec/100 cc, 13,000 μm·sec/100 cc, 15,000 μm·sec/100 cc, 16,000 μm·sec/100 cc, 18,000 μm·sec/100 cc, 20,000 μm·sec/100 cc, 25,000 μm·sec/100 cc, 28,000 μm·sec/100 cc, 30,000 μm·sec/100 cc, 35,000 μm·sec/100 cc, 40,000 μm·sec/100 cc, 45,000 μm·sec/100 cc, 50,000 μm·sec/100 cc, 55,000 μm·sec/100 cc, 60,000 μm·sec/100 cc, 65,000 μm·sec/100 cc, 70,000 μm·sec/100 cc, or 75,000 μm·sec/100 cc.

Figure 2:
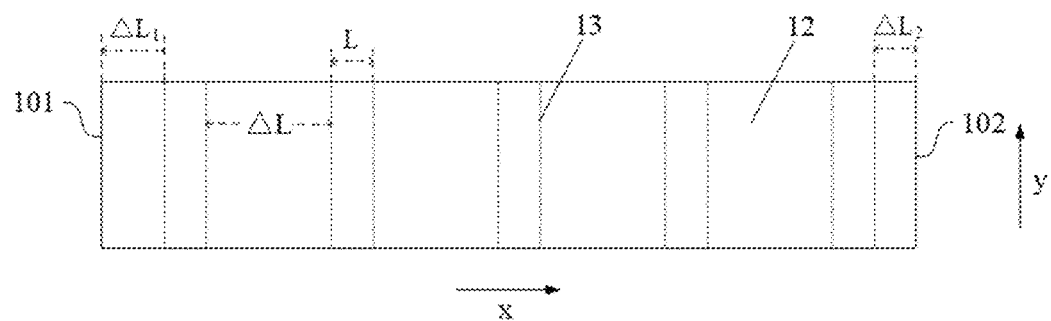
FIG. 2 is a structural schematic view of a projection of a first coating located on a first current collector according to another embodiment of the disclosure.
Figure 3:
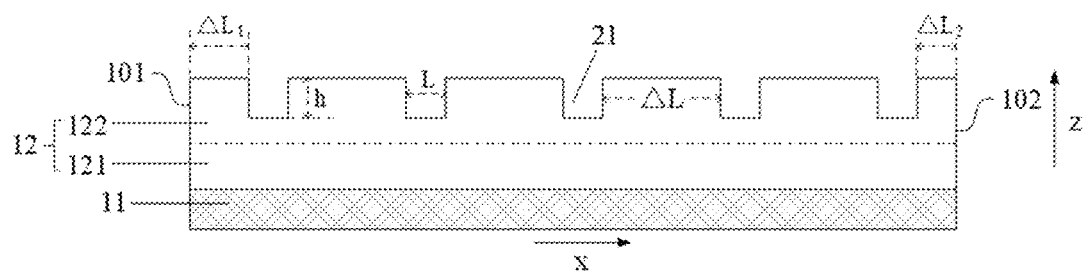
FIG. 3 is a structural schematic cross-sectional view of a first electrode plate according to one embodiment of the disclosure.

Specifically, the surface of the first coating 12 may be provided with one recess 13 (i.e., the recess 13 is provided continuously in the surface of the first coating 12), or, as shown in FIGS. 1 to 3, the surface of the first coating 12 is provided with at least two recesses 13. The recesses 13 may be distributed in a first direction x (as shown in FIG. 2) or in a second direction y, or some of recesses 13 are distributed in the first direction x and some of the recesses 13 are distributed in the second direction y.

As shown in FIGS. 1 to 3, at least some of the recesses 13 are distributed in the first direction x, two recesses 13 adjacent to each other in the first direction x are spaced apart by the first coating 12, and a spacing between the recesses 13 adjacent to each other in the first direction x (i.e., a distance between two adjacent recesses 13 in the first direction x) ΔL>0.

Specifically, the surface of the first coating 12 may include at least one recess group 130, each recess group 130 including at least two recesses 13 distributed in the first direction x. When there are at least two recess groups 130 (i.e., the surface of the first coating 12 includes at least two recess groups 130), the recess groups 130 are distributed in the second direction y.

By way of example, as shown in FIG. 1, the surface of the first coating 12 includes two recess groups 130, the recess groups 130 being distributed in the second direction y. In each recess group 130, a side edge in a length direction of the recess 13 is substantially flush with a side edge in a width direction of the first coating 12. Alternatively, as shown in FIG. 2, the surface of the first coating 12 is provided with one recess group 130, where the length of the recess 13 in the second direction y is substantially equal to the width of the first coating.

In some embodiments, a distance w between the recesses 13 of one recess group 130 of two adjacent recess groups 130 and the recesses 13 of the other recess group 130 in the second direction y is less than or equal to 1 mm (i.e., w≤1 mm). The following relationship is basically satisfied: the width of the first coating=the length of the recesses 13 of one recess group 130 in the second direction y+the length of the recesses 13 of the other recess group 130 in the second direction y+w.

A recess 13 in one recess group 130 of two adjacent recess groups 130 may or may not communicate with a recess 13 in the other recess group 130 that is closest to that recess 13. When the two recesses 13 communicate with each other, the gap (distance) w between the two recesses 13 (in the second direction y) is substantially equal to 0.

With continued reference to FIGS. 1 to 3, the spacing ΔL between two adjacent recesses 13 in the first direction x is greater than 0, the first coating 12 has a first side 101 and a second side 102 opposite to each other in the first direction x, a distance ΔL1 between the recess 13 closest to an outer edge of the first side 101 of the first coating 12 and the outer edge of the first side 101 of the first coating 12 is less than or equal to the spacing ΔL between two adjacent recesses 13 (ΔL1≤ΔL), and a distance ΔL2 between the recess 13 closest to an outer edge of the second side 102 of the first coating 12 and the outer edge of the second side 102 of the first coating 12 is less than or equal to ΔL (ΔL2≤ΔL), such that the recesses 13 are arranged at a spacing ΔL over the entire surface of the first coating 12.

The spacing ΔL between two adjacent recesses 13 in the first direction x is the distance between the two adjacent recesses 13 in the first direction x, and is also the spacing between two adjacent recesses 13 of each recess group 130.

With continued reference to FIGS. 1 to 3, width directions of the recesses 13 are substantially parallel to the first direction x, and the length directions (extension directions) of the recesses 13 are substantially perpendicular to the first direction x.

Specifically, the recess 13 may be in the form of a hole, groove or the like. The recess 13 is a linear groove, i.e., the projection of the recess 13 on the first current collector 11 is strip-like (as shown in FIGS. 1 and 2), and may specifically be a rectangle (as shown in FIG. 2) or other regular or irregular shapes.

With continued reference to FIGS. 1 and 2, when at least two recesses 13 are provided in the surface of the first coating 12, each recess 13 is a linear groove, of which the projection on the first current collector 11 is substantially rectangular. The length directions (extension directions) of the recesses 13 are substantially parallel to each other, and may specifically be parallel to the second direction y, and the width directions of the recesses 13 are substantially parallel to each other, and may be substantially parallel to the first direction x.

In the embodiments of the disclosure, laser may be used to ablate recesses 1321, which have a preset shape and preset parameters such as thickness, width, length and spacing, in the surface of the first coating 12. For example, recesses 13 (linear grooves) may be formed in the surface of the first coating 12 by laser ablation. Specifically, the thickness and other parameters of the recesses 1321 formed may be adjusted by regulating parameters such as laser intensity. The regulating means are conventional operations in the art and will not be described in detail.

As shown in FIG. 2, the recess 13 may be a complete continuous groove. That is, the laser is used to continuously drill holes in the surface of the first coating 12 along the extension direction of the preset linear groove to form the continuous groove (in this case, one recess group 130 is formed in the surface of the first coating 12).

Alternatively, when the laser is used to drill holes on the surface of the first coating 12, the holes are not drilled continuously, but are drilled intermittently. For example, as shown in FIG. 1, in the second direction y, an upper half of a recess 13 (a recess 13 in one recess group 130) is ablated first, and a lower half of the recess 13 (a recess 13 in the other recess group 130) is then ablated. The two recesses 13 may substantially communicate or not communicate with each other (with a gap w≤1 mm). This is equivalent to that an entire recess 13 penetrating the entire surface of the first coating 12 in the second direction y is formed by splicing a plurality of sections of the recess 13 (that is, the entire recess 13 is formed by splicing a plurality of sections of the recess 13). In this case, the surface of the first coating 12 includes at least two recess groups 130.

The inventors have found through research that the surface of the first coating 12 including at least two recess groups 130 facilitates a further improvement in the electrochemical properties and the safety performance of the battery. The reason for this is that the surface of the first coating 12 including at least two recess groups 130 facilitates the guiding of the flow of an electrolyte, so that the electrolyte can more fully wet the battery cell, and the electrolyte storage capacity of the battery cell is improved, thereby improving the migration ability of active ions such as lithium ions between the first electrode plate 1, the separator 3 and the second electrode plate 2, increasing the electrical conductivity, reducing the voltage drop, and reducing the risk of short circuit.

In addition, in general, when a recess 13 is formed by laser, due to factors such as the laser equipment and the laser operation process, it is generally necessary to perform multiple times of drilling on a preset region for the recess 13 (each drilling forming one recess 13), such that at least two recess groups 130 are formed in the surface of the first coating 12. In this way, the laser drilling process can be more adapted while improving the safety and the electrochemical properties of the battery, thereby facilitating the formation of the recesses 13.

Specifically, the first direction x and the second direction y intersect, and the two may specifically be perpendicular to each other. As shown in FIGS. 1 and 2, the second direction y, the length direction of the recess 13, the width direction of the first coating 12, a width direction of the first current collector 11, and a width direction of the first electrode plate 1 are substantially parallel to one another, and the first direction x, the width direction of the recess 13, a length direction of the first coating 12, a length direction of the first current collector 11, and a length direction of the first electrode plate 1 are substantially parallel to one another.

In addition, as shown in FIG. 3, the recess 13 extends from the surface of the first coating 12 toward the interior of the first coating 12, and a depth direction of the recess 13 may be substantially parallel to a third direction z. The third direction z, a thickness direction of the first coating 12, a thickness direction of the first current collector 11, a thickness direction of the first electrode plate 1, and a thickness direction of the separator 3 are parallel to one another.

In general, as shown in FIG. 3, the depth of the recess 13 is less than the thickness of the first coating 12, i.e., the recess 13 does not penetrate the first coating 12 in the thickness direction of the first coating 12. In other words, the first coating 12 exists between the recess 13 and the first current collector 11.

Figure 4:
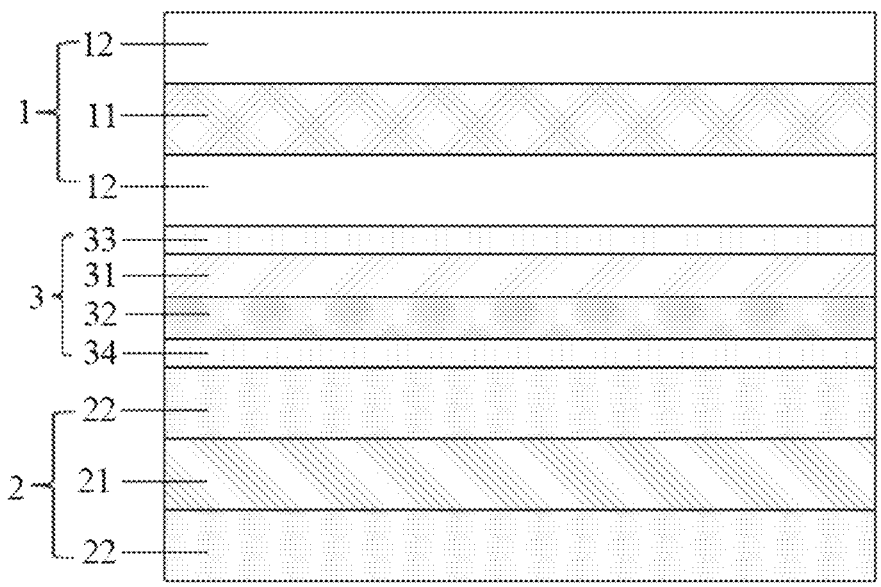
FIG. 4 is a structural schematic view of a stack of a first electrode plate, a separator, and a second electrode plate of a battery cell according to one embodiment of the disclosure.
Figure 5:
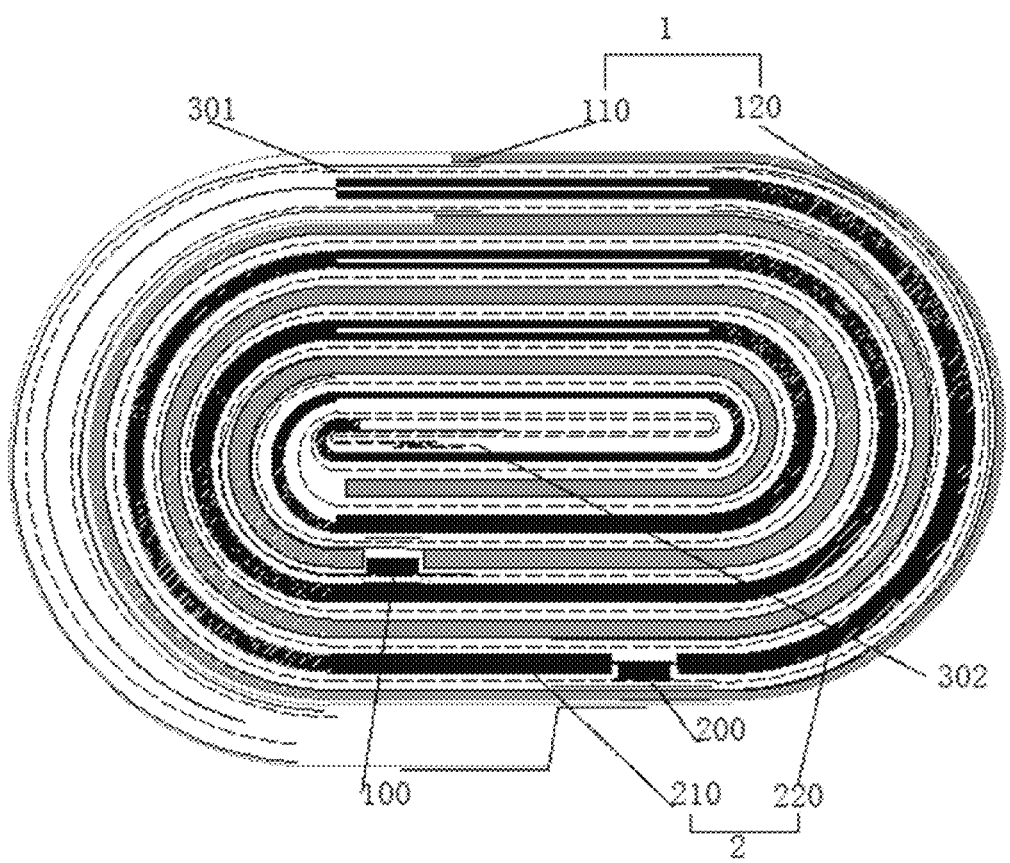
FIG. 5 is a structural schematic view of a battery cell according to one embodiment of the disclosure.

With continued reference to FIGS. 4 and 5, the battery further includes a second electrode plate 2 having an opposite polarity to the first electrode plate 1, and the separator 3 is located between the first electrode plate 1 and the second electrode plate 2, for preventing contact and short circuiting between the first electrode plate 1 and the second electrode plate 2.

The second electrode plate 2 includes a second current collector 21, and a second coating 22 located on a surface of at least one side of the second current collector 21. The second coating 22 is connected to the separator 3, and the second coating 22 may include a second active material, a second conductive agent, a second binder and other materials.

Specifically, the first electrode plate 1 may be a negative electrode plate. Accordingly, the first current collector 11 is a negative electrode current collector, and the first coating 12 is a negative electrode coating (negative electrode active material layer). The second electrode plate 2 may be a positive electrode plate. Accordingly, the second current collector 21 is a positive electrode current collector, the second coating 22 is a positive electrode coating (positive electrode active material layer), and the second active material is a positive electrode active material.

Generally, the first coating 12 of the first electrode plate 1 is bonded to the separator 3, to bond the first electrode plate 1 to the separator 3; and the second coating 22 of the second electrode plate 2 is bonded to the separator 3, to bond the second electrode plate 2 to the separator 3.

Specifically, as shown in FIG. 4, the separator 3 may include a base film 31, and a first adhesive layer 33 located on a side surface of the base film 31 facing the first electrode plate 1, and a second adhesive layer 34 located on a side surface of the base film 31 facing the second electrode plate 2. The first coating 12 is bonded to the first adhesive layer 33, and the second coating 22 is bonded to the second adhesive layer 34.

Specifically, the battery includes a battery cell, the battery cell including a first electrode plate 1, a second electrode plate 2, and a separator 3 located between the first electrode plate 1 and the second electrode plate 2. The first electrode plate 1, the separator 3 and the second electrode plate 2 are bonded in sequence (i.e., the first electrode plate 1 is bonded to one side surface of the separator 3, and the second electrode plate 2 is bonded to the other side surface of the separator 3). In a specific implementation, the first electrode plate 1, the separator 3 and the second electrode plate 2 may be placed in sequence and then hot-pressed in one piece.

Specifically, the battery cell may be a wound battery cell (wound cell), i.e., the first electrode plate 1 and the second electrode plate 2 each have a wound structure. The first electrode plate 1 includes at least one first flat region 110 and a first bent region 120 connected to the first flat region 110. There is generally a plurality of first flat regions 110, and there is generally at least one first bent region 120, specifically, there may be a plurality of first bent regions. The first electrode plate 1 is bent by means of the first bent area, to form a wound structure. The second electrode plate 2 includes at least one second flat region 210 and a second bent region 220 connected to the second flat region 210. There is generally a plurality of second flat regions 210, and there is generally at least one second bent region 220, specifically, there may be a plurality of second bent regions. The second electrode plate 2 is bent by means of the second bent region 220, to form a wound structure. The first flat region 110 and the second flat region 210 are arranged in a stack.

In a specific implementation, it is possible that after the first electrode plate 1, the separator 3, and the second electrode plate 2 are placed in sequence, the formed laminated structure is wound and then hot-pressed, to hot-press the first electrode plate 1, the separator 3 and the second electrode plate 2 into one piece to form a wound battery cell.

In some embodiments, a peel force (bonding force) between the positive electrode plate (the second electrode plate 2) and the separator 3 may be from 1 to 20 N/m, for example, 1 N/m, 3 N/m, 5 N/m, 8 N/m, 10 N/m, 13 N/m, 15 N/m, 18 N/m, 20 N/m, or within a range consisting of any two thereof, thereby facilitating a further improvement in the safety and other performances of the battery while improving the rate capability of the battery.

In the embodiments of the disclosure, the peel force between the positive electrode plate and the separator 3 may be measured with reference to GB/T 2792-2014, "Measurement of peel adhesion properties for adhesive tapes", and the measurement process may be carried out in an environment with a dew point≤−35°, for example, in a room with a dew point≤−35°. During the measurement, the battery is first discharged at 0.2 C to 3.0 V and then disassembled to obtain a battery cell. A first electrode plate 1 is peeled from the battery cell, and the remaining laminated structure of a second electrode plate 2 and a separator 3 (ensuring that the sample is intact and not damaged) is used as a sample to be measured. The sample to be measured is then cut into 15 mm wide pieces, and a tensile tester is then used to measure a bonding force between the separator and the positive electrode plate. The measurement method refers to GB/T 2792-2014, "Measurement of peel adhesion properties for adhesive tapes".

In addition, the battery further includes an encapsulation body for encapsulating the battery cell. The encapsulation body may include a pouch film (i.e., the battery is a pouch battery), which may be a pouch film formed of a conventional pouch material in the art. For example, the encapsulation body includes, but is not limited to, an aluminum-plastic film.

The embodiments of the disclosure can also facilitate maintaining a thin thickness of the battery cell while reducing the voltage drop of the battery and improving the rate capability of the battery, thereby improving the energy density and other performances of the battery. For example, the battery is a pouch battery, and the thickness of the battery may be from 1 to 8 mm, for example, 1 mm, 2 mm, 3 mm, 4 mm, 5.1 mm, 5.2 mm, 5.25 mm, 5.28 mm, 5.3 mm, 5.35 mm, 5.38 mm, 5.4 mm, or within a range consisting of any two thereof.

Furthermore, the battery further includes tabs connected to the battery cell. The tab include a first tab 100 (negative electrode tab) connected to the first current collector 11, and a second tab 200 (positive electrode tab) connected to the second current collector 21. The first tab 100 and the second tab 200 respectively extend out of the encapsulation body, to connect the battery to an electronic product in which the battery is used.

With continued reference to FIG. 4, the separator 3 may further include a ceramic layer 32. The ceramic layer 32 is located between the base film 31 and the second adhesive layer 34. That is, the separator 3 includes a base film 31, a first adhesive layer 33 located on a side of the base film 31 facing the first electrode plate 1, a ceramic layer 32 located on a side of the base film 31 facing away from the first electrode plate 1, and a second adhesive layer 34 located on a side of the ceramic layer 32 facing the second electrode plate 2, so that a further improvement in the safety and other performances of the battery is facilitated. The reason for this is that the ceramic layer 32 integrated in the separator 3 can conduct heat, facilitating the conduction of heat generated in the battery cell due to factors such as side reactions of the electrode material and the electrolyte, allowing heat to be dissipated through the encapsulation body for encapsulating the battery cell or through the tabs connected to the battery cell, thereby improving the safety of the battery. Moreover, the ceramic layer 32 is provided on the side of the base film 31 facing the second electrode plate 2, but no ceramic layer 32 is provided on the side of the base film 31 facing the first electrode plate 1, so that it is possible to avoid the problems such as a large amount of powder remaining in the recess 13 of the first electrode plate 1 due to the provision of the ceramic layer 32, and the powder piercing the separator 3, thereby causing a short circuit between the positive and negative electrodes.

According to the research by the inventors, the thickness $H_{31}$ of the base film 31, the thickness $H_{32}$ of the ceramic layer 32, and the spacing $\Delta L$ between two adjacent recesses 13 may satisfy: $2\times10^{-3}$ mm$^2 \leq \Delta L \times (H_{31}+H_{32}) \leq 25\times10^{-3}$ mm$^2$. This further facilitates reducing the voltage drop of the battery, improving the rate capability of the battery, and reducing the thickness of the battery (increasing the energy density of the battery). The reason for this is that the recess 13 is formed by laser ablation or the like, the laser energy is strong, the radiation range is wide, and the viscosity between material particles of the active material of the first coating is likely to be reduced, so that the material particles are likely to fall away during the manufacturing of the first electrode plate or during charging/discharging of the battery, thereby increasing the risk of the material particles puncturing the separator to form a micro short circuit. $\Delta L$ represents to some extent the ablation density (also the density of the recesses 13 in the surface of the first coating 12). As $\Delta L$ decreases, the denser of the recesses 13 in the surface of the first coating 12 increases, and a corresponding thicker separator is adaptively used (i.e., a larger $H_{31}+H_{32}$ is adaptively used (equivalent to $\Delta L$ being negatively correlated with $H_{31}+H_{32}$)). As $\Delta L$ increases, a corresponding smaller $H_{31}+H_{32}$ is adaptively used. Based on the research analysis of the inventors, synergistically regulating $\Delta L$, $H_{31}$ and $H_{32}$ such that they satisfy $2\times10^{-3}$ mm$^2 \leq \Delta L \times (H_{31}+H_{32}) \leq 25\times10^{-3}$ mm$^2$ can further improve the rate capability and other performances of the battery while reducing the voltage drop of the battery.

By way of example, $\Delta L \times (H_{31}+H_{32})$ may be $2\times10^{-3}$ mm$^2$, $5\times10^{-3}$ mm$^2$, $8\times10^{-3}$ mm$^2$, $10\times10^{-3}$ mm$^2$, $13\times10^{-3}$ mm$^2$, $15\times10^{-3}$ mm$^2$, $18\times10^{-3}$ mm$^2$, $20\times10^{-3}$ mm$^2$, $21\times10^{-3}$ mm$^2$, $22.5\times10^{-3}$ mm$^2$, $25\times10^{-3}$ mm$^2$, or within a range consisting of any two thereof.

Specifically, the thickness H32 of the ceramic layer 32 may be from 0.5 to 5 μm, for example, 0.5 μm, 1 μm, 1.5 μm, 2 μm, 2.5 μm, 3 μm, 3.5 μm, 4 μm, 4.5 μm, 5 μm, or within a range consisting of any two thereof.

Specifically, the ceramic layer 32 may include ceramic particles and a third binder. The third binder is configured to bond the ceramic particles and can increase the bonding force between the ceramic layer 32 and a film layer such as the base film 31.

In some embodiments, the third binder may include one or more of polyvinylidene fluoride (PVDF), polyvinylidene fluoride-hexafluoropropylene copolymer (PVDF-HFP), and polymethyl methacrylate (PMMA).

Furthermore, the ceramic particles may include one or more of alumina, boehmite, magnesium oxide, magnesium hydroxide, and titanium oxide.

Specifically, the percentage by mass of the ceramic particles in the ceramic layer 32 (i.e., the ratio of the mass of the ceramic particles to the total mass of the ceramic layer 32) may be from 50% to 99.8%, for example, 50%, 60%, 70%, 80%, 83%, 85%, 88%, 90%, 93%, 95%, 97%, 99.5%, 99.8%, or within a range consisting of any two thereof. This facilitates a further improvement in the heat dissipation performance of the battery, while maintaining an appropriate amount of third binder in the ceramic layer 32, thereby increasing the adhesion between the ceramic particles of the ceramic layer 32, and the bonding force between the ceramic layer 32 and the base film 31.

According to the research by the inventors, the particle size Dv95 of the ceramic particles and the width L of the recess 13 may satisfy: 25≤L/Dv95≤1500, where L is in μm, and Dv95 is in μm. Relatively speaking, If L/Dv95 is too small (<25), the rate capability of the battery will be reduced to some extent, and if L/Dv95 is too large (>1500), the voltage drop of the battery will be increased to some extent. The reason for this is that the formation of the recess 13 in the surface of the first coating 12 by laser ablation or the like will increase the surface area of the first coating 12, the interfacial contact area between a material such as the active material and the electrolyte is thus increased, thereby increasing side reactions, resulting in the problems of gas generation, heat generation, etc., and affecting the safety of the battery, for example, adversely affecting the furnace temperature test pass rate of the battery. Moreover, relatively speaking, the smaller the Dv95 of the ceramic particles, the more prone the ceramic particles are to fall away. In this way, the adhesion between the separator 3 to the second electrode plate 2 can be reduced, facilitating timely cutting off the contact between of the positive and negative electrodes, thereby ensuring the safety of the battery. Therefore, synergistically regulating the Dv95 of the ceramic particles and the width L of the recess 13 such that they satisfy 25≤L/Dv95≤1500 facilitates a further improvement in the safety and other performances of the battery while improving the rate capability of the battery.

By way of example, L/Dv95 may be 25, 50, 150, 200, 250, 300, 400, 500, 700, 900, 1000, 1300, 1500, or within a range consisting of any two thereof.

Specifically, the particle size Dv95 of the ceramic particles may be from 0.1 to 2 μm, for example, 0.1 μm, 0.3 μm, 0.5 μm, 0.8 μm, 1 μm, 1.3 μm, 1.5 μm, 1.8 μm, 2 μm, or within a range consisting of any two thereof.

After further research, in the first coating 12, the spacing ΔL between two adjacent recesses 13 and the thickness $H_{31}$ of the base film 31 satisfy $2.1 \times 10^{-3}$ mm$^2$≤ΔL× $H_{31}$≤$15 \times 10^{-3}$ mm$^2$, where ΔL is in mm, and $H_{31}$ is in μm. Relatively speaking, if ΔL× $H_{31}$ is too small (<$2.1 \times 10^{-3}$ mm$^2$), the voltage drop of the battery will be increased to some extent, and if ΔL× $H_{31}$ is too large (>$15 \times 10^{-3}$ mm$^2$), the rate capability of the battery will be reduced to some extent, and the thickness of the battery cell will also be increased to some extent, affecting the energy density of the battery. Therefore, synergistically regulating ΔL and $H_{31}$ such that they satisfy $2.1 \times 10$-3 mm$^2$≤ΔL× $H_{31}$≤$15 \times 10^{-3}$ mm$^2$ further facilitates reducing the voltage drop of the battery, improving the rate capability, the energy density and other performances of the battery.

Specifically, the formation of the recess 13 in the surface of the first coating 12 by laser ablation or the like facilitates an improvement in the dynamics performance of the battery at a high areal density. However, when the recess 13 is formed in the surface of the first coating 12 by laser ablation or the like, it is likely to generate electrode powder (particulate dust), and part of the powder will remain in the formed recess 13. During charging/discharging of the battery, the powder remaining in the recess 13 poses a risk of puncturing the separator 3, etc., thereby increasing the risk of short circuit of the battery cell and affecting the safety and other performances of the battery.

In the embodiments of the disclosure, controlling the spacing ΔL between two adjacent recesses 13 and the thickness $H_{31}$ of the base film 31 to satisfy $2.1 \times 10^{-3}$ mm$^2$≤ΔL× $H_{31}$<$15 \times 10^{-3}$ mm$^2$ can reduce the voltage drop of the battery cell, reduce the risk of short circuit of the battery cell, and improve the safety, the rate capability and other performances of the battery. The reason for this is that the spacing ΔL between the recesses 13 determines the density of the recesses 13 in the surface of the first coating 12, the smaller the spacing ΔL between the recesses 13, the denser the recesses 13 in the surface of the first coating 12, so that it is more advantageous to reduce the polarization impedance of the first electrode plate 1 and improve the rate capability of the battery, while the energy density of the battery can be increased by increasing the design areal density of the first electrode plate 1. However, the denser the recesses 12, the more particulate dust will remain on the surface of the first electrode plate 1, so that it is more likely to cause a short circuit, and therefore it is necessary to adaptively use a separator 3 with a larger thickness (equivalent to the spacing ΔL between the recesses 13 being negatively correlated with the thickness $H_{31}$ of the base film 31). Conversely, the larger the spacing ΔL between the recesses 13, the sparser the recesses 13 in the surface of the first coating 12, so that a separator 3 with a smaller thickness is adaptively used. However, when the spacing ΔL between the recesses 13 is too small, the too sparse recesses 13 in the surface of the first coating 12 will also have limited effect on improving the rate capability and other performances of the battery. Therefore, taking the above factors into account together, synergistically regulating the spacing ΔL between the recesses 13 and the thickness $H_{31}$ of the base film 31 of the separator 3 such that they satisfy $2.1 \times 10^{-3}$ mm$^2$≤ ΔL× $H_{31}$≤$15 \times 10^{-3}$ mm$^2$ can improve the safety, the rate capability and other performances of the battery.

By way of example, ΔL× $H_{31}$ may be $2.1 \times 10^{-3}$ mm$^2$, $2.5 \times 10^{-3}$ mm$^2$, $3 \times 10^{-3}$ mm$^2$, $4 \times 10^{-3}$ mm$^2$, $4.8 \times 10^{-3}$ mm$^2$, $5 \times 10^{-3}$ mm$^2$, $6 \times 10^{-3}$ mm$^2$, $8 \times 10^{-3}$ mm$^2$, $10 \times 10^{-3}$ mm$^2$, $13 \times 10^{-3}$ mm$^2$, $15 \times 10^{-3}$ mm$^2$, or within a range consisting of any two thereof.

Specifically, the thickness H31 of the base film 31 may be from 2 to 15 μm, for example, 2 μm, 5 μm, 8 μm, 10 μm, 13 μm, 15 μm, or within a range consisting of any two thereof.

In addition, the depth h of the recess 13 and the thickness H33 of the first adhesive layer 33 may satisfy 1≤h/2H33≤60, to facilitate a further improvement in the safety, the rate capability and other performances of the battery. The reason for this is that the greater the depth h of the recess 13, the greater the thickness of the first adhesive layer 33 that is to be matched, in order that the separator 3 is more fully filled in the recess 13, so that the first electrode plate 1 is in closer contact with the separator 3, the adhesion between the first electrode plate 1 and the separator 3 is improved, and the stability and other performances of the battery cell are improved. However, if the first adhesive layer 33 is too thick, the passage of the active ions such as lithium ions through the separator 3 will be impeded to some extent, that is, the migration of the active ions between the positive and negative electrodes will be affected. Therefore, by taking these factors into account together, synergistically regulating the depth h of the recess 13 and the thickness H33 of the first adhesive layer 33 such that they satisfy $1 \leq 2h/\text{H33} \leq 60$ can improve the safety, the rate capability and other performances of the battery.

By way of example, $2h/\text{H33}$ may be 1, 3, 5, 7.5, 10, 15, 20, 30, 40, 50, 60, or within a range consisting of any two thereof.

Specifically, the thickness H33 of the first adhesive layer 33 may be from 0.25 to 2.5 μm, for example, 0.25 μm, 0.5 μm, 0.75 μm, 1 μm, 1.3 μm, 1.5 μm, 1.8 μm, 2 μm, 2.3 μm, 2.5 μm, or within a range consisting of any two thereof.

In addition, the thickness of the second adhesive layer 34 may be from 0.25 to 2.5 μm, for example 0.25 μm, 0.5 μm, 0.75 μm, 1 μm, 1.3 μm, 1.5 μm, 1.8 μm, 2 μm, 2.3 μm, 2.5 μm, or within a range consisting of any two thereof.

Specifically, the thickness of the second adhesive layer 34 and the thickness of the first adhesive layer 33 may be equal or different.

In general, the first coating 12 (first active material layer) includes materials such as a first active material (positive electrode active material), a first conductive agent, and a first binder. The first active material may include a silicon-based material and/or graphite. The silicon-based material includes one or more of a silicon-carbon material, a silicon-oxygen material, elemental silicon, and a silicon alloy. The graphite may include artificial graphite and/or natural graphite.

In some embodiments, the first active material (negative electrode active material) includes a silicon-based material, and may specifically include graphite and a silicon-based material, in which case the first electrode plate 1 is a silicon-doped negative electrode plate. By doping with the silicon-based material, an improvement in the energy density and other performances of the battery is facilitated.

According to a further research by the inventors, the spacing ΔL between two adjacent recesses 13, the width L of the recess 13, the mass ratio (amount of doped silicon) n of silicon-based material to graphite in the first coating 12 may satisfy $0.015 \leq \Delta L/(L \times \eta) \leq 3$, where ΔL is in mm and L is in μm, so that a further improvement in the safety and other performances of the battery is facilitated. The reason for this is that the silicon-based material suffers from severe heat generation and is prone to volumetric expansion, so that it is likely to cause problems such as the expansion of the first electrode plate 1, and the silicon-based material puncturing the separator 3. The provision of the recesses 13 in the surface of the first coating 12 facilitates the conduction of heat, to conduct away heat generated in the battery cell due to factors such as side reactions of the silicon-based material, so that heat is dissipated through the encapsulation body for encapsulating the battery cell or through the tabs connected to the battery cell, and the problems such as the expansion of the first electrode plate 1, and the silicon-based material puncturing the separator 3 caused by the expansion of the silicon-based material can be alleviated to some extent. Moreover, the silicon-based material and graphite are each present in the first electrode plate 1 in the form of particles. The silicon-based material particles have a greater hardness than the graphite particles, so that the risk of the silicon-based material particles puncturing the separator 3 after being exposed is greater (for example, during a hot-pressing process in the preparation of the battery cell, a formation process after encapsulation of the battery cell, a recycling process of the battery, and other processes, the silicon-based material is exposed from the first coating 12 due to factors such as expansion, and is likely to puncture the separator 3). The greater the amount of doped silicon n and the more the silicon-based material is exposed, the larger the area proportion of the recesses 13, and the larger the size of the exposed silicon-based material, so that ΔL/L is substantially positively correlated with the amount of doped silicon n. Therefore, by taking the above factors into account together, synergistically regulating ΔL, L and n such that they satisfy $0.015 \leq \Delta L/(L \times \eta) \leq 3$ can improve the safety and other performances of the battery while increasing the energy density of the battery.

By way of example, $\Delta L/(L \times \eta)$ may be 0.015, 0.03, 0.05, 0.08, 0.1, 0.3, 0.5, 0.8, 1, 1.3, 1.5, 1.8, 2, 2.3, 2.5, 2.8, 3, or within a range consisting of any two thereof.

In addition, relatively speaking, if the amount of doped silicon is too low, the effect on improving the energy density of the battery will be limited. If the content of the silicon-based material is too high, the first electrode plate 1 is likely to undergo a large volumetric expansion during the charge/discharge cycling of the battery, which will affect the cycling and safety performances of the battery to some extent. By further considering these factors, in the first active material, the mass ratio (i.e., the amount of doped silicon) n of silicon-based material to graphite may be from 1% to 30%, for example 1%, 5%, 10%, 15%, 20%, 25%, 30%, or within a range consisting of any two thereof.

In some embodiments, the silicon-based material includes a silicon-carbon material (i.e., the first active material including a silicon-carbon material). The deposition of silicon within a carbon framework of the silicon-carbon material facilitates the mitigation of the expansion of the silicon-carbon material, thereby reducing the expansion rates of the first electrode plate 1 and the battery, and improving the safety and other performances of the battery.

After further research, the mass ratio of silicon to carbon (Si:C ratio) a of the silicon-carbon material and the depth h of the recess 13 may satisfy $0.004\ \mu m^{-1} \leq a/h \leq 0.2\ \mu m^{-1}$, where h is in μm, so that a further improvement in the safety and other performances of the battery is facilitated. The reason for this is that the silicon-carbon particles have a greater hardness than the graphite particles, and the risk of the silicon carbon particles puncturing the separator 3 after being exposed is thus greater. The higher the silicon content of the silicon carbon particles, the more likely it is to undergo a volumetric expansion, and thus the more likely it is to be exposed to puncture the separator 3. The recesses 13 provided in the surface of the first coating 12 can accommodate the expanded silicon-carbon material particles to relieve the expansion stress thereof. The depth h of the recess 13 is positively correlated with the Si:C ratio of the silicon-carbon material. The higher the Si content in the silicon-carbon material, the greater the depth h of the recess 13 to which it is adapted should be, in order to prevent the exposure of silicon-carbon particles. Therefore, synergistically regulating the Si:C ratio of the silicon-carbon material and the depth h of the recess 13 such that they satisfy $0.004\ \mu m^{-1} \leq a/h \leq 0.2\ \mu m^{-1}$ can improve the safety and other performances of the battery while increasing the energy density of the battery.

By way of example, a/h may be $0.004\ \mu m^{-1}$, $0.006\ \mu m^{-1}$, $0.008\ \mu m^{-1}$, $0.1\ \mu m^{-1}$, $0.13\ \mu m^{-1}$, $0.15\ \mu m^{-1}$, $0.18\ \mu m^{-1}$, $0.2\ \mu m^{-1}$, or within a range consisting of any two thereof.

Specifically, the Si:C ratio of the silicon-carbon material may be from 0.1 to 3. The higher the silicon content of the silicon-carbon material and the greater the particle hardness thereof, the greater the challenge to the safety of the battery, the greater the particle expansion rate during charging/discharging, and the more likely it is to cause a short circuit during charging/discharging to cause safety problems. Therefore, controlling a to satisfy 0.1≤a≤3 can improve the safety and other performances of the battery while increasing the energy density of the battery.

In one embodiment, the Si:C ratio of the silicon-carbon material may be from 0.1 to 0.9 (i.e., 0.1≤a≤0.9), for example, 0.1, 0.3, 0.5, 0.7, 0.9, or within a range consisting of any two thereof. Controlling a in the range of 0.1 to 0.9 can ensure that the voltage drop of the battery is controlled within a certain range to the maximum extent under the condition that the energy density of the battery is satisfied, to ensure the safety performance of the battery during the entire cycle life.

Specifically, the Si:C ratio of the silicon-carbon material may be from 0.9 to 2.5 (i.e., 0.9<a≤2.5), for example, 0.91, 1.0, 1.3, 1.5, 1.6, 1.9, 2.0, 2.1, 2.2, 2.5, or within a range consisting of any two thereof.

Specifically, the Si:C ratio of the silicon-carbon material may be from 2.5 to 3 (i.e., 2.5<a≤3), for example, 2.51, 2.6, 2.9, 3.0, or within a range consisting of any two thereof.

In the embodiments of the disclosure, the process for measuring the Si:C ratio (a) of the silicon-carbon material may include: disassembling a battery after discharging it to 3.0 V at a rate of 0.2 C, and obtaining a first electrode plate 1 from a battery cell; soaking the first electrode plate 1 in DMC for at least 2 hours, and then standing the first electrode plate in a room with a dew point of ≤−35° for at least 2 hours to allow the first coating 12 to fall away from a first current collector 11, and then drying the first coating 12 (i.e., removing the DMC) to obtain a sample to be measured; and then using an energy dispersive spectrometer (EDS) to scan silicon-carbon material particles in the sample to be measured at a rate of 2.5K to measure the Si:C ratio (a) of the silicon-carbon particles.

With continued reference to FIG. 3, the first coating 12 may include a first sublayer 121, and a second sublayer 122 located on a side of the first sublayer 121 facing away from the first current collector 11 (i.e., the first sublayer 121 is located between the second sublayer 122 and the first current collector 11). The second sublayer 122 may specifically be a second sublayer 122 connected to the separator 3. A particle size Dv50 of the first active material in the first sublayer 121 is greater than a particle size Dv50 of the first active material in the second sublayer 122.

Specifically, the first active material in the first sublayer 121 may include graphite and/or a silicon-based material, and the first active material in the second sublayer 122 may include graphite and/or a silicon-based material.

For example, the first active material in the first sublayer 121 is graphite, and the first active material in the second sublayer 122 is graphite. Alternatively, the first active material in the first sublayer 121 is graphite and a silicon-based material, and the first active material in the second sublayer 122 is graphite. Alternatively, the first active material in the first sublayer 121 is graphite, and the first active material in the second sublayer 122 is graphite and a silicon-based material. Alternatively, the first active material in the first sublayer 121 is graphite and a silicon-based material, and the first active material in the second sublayer 122 is graphite and a silicon-based material.

When the first active material in each of the first sublayer 121 and the second sublayer 122 includes a silicon-based material, the silicon-based material in the first sublayer 121 and the silicon-based material in the second sublayer 122 may be the same or different, i.e., the two may be the same silicon-based material, or different kinds of silicon-based materials.

Specifically, the particle size Dv50 (denoted as D1) of the first active material in the first sublayer 121 and the particle size Dv50 (denoted as D2) of the first active material in the second sublayer 122 may satisfy 0.03≤D2/D1<1.

In some embodiments, the particle size Dv50 (D1) of the first active material in the first sublayer 121 may be from 5 to 30 μm, for example, 5 μm, 10 μm, 15 μm, 20 μm, 25 μm, 30 μm, or within a range consisting of any two thereof, thereby facilitating a good pressure resistance of the first coating 12, further improving the structural stability and other properties of the first electrode plate 1, and improving the safety and the electrochemical performance of the battery.

In some embodiments, the particle size Dv50 (D2) of the first active material in the second sublayer 122 may be from 1 to 25 μm, for example, 5 μm, 10 μm, 15 μm, 20 μm, 25 μm, or within a range consisting of any two thereof, thereby facilitating a good electrolyte wettability of the first coating 12, and further improving the electrochemical performance of the battery.

In the embodiments of the disclosure, the particle size Dv50 (average particle size D1, D2) of the first active material represents a particle size at which 50% of the cumulative volume of the first active material particles is counted from the smaller particle size side in the volume-based particle size distribution, and can be measured by a conventional method in the art, for example, by a laser particle size analyzer.

In the embodiments of the disclosure, the particle size Dv95 of the ceramic particles represents a particle size at which 95% of the cumulative volume of the ceramic particles is counted from the smaller particle size side in the volume-based particle size distribution, and can be measured by a conventional method in the art, for example, by a laser particle size analyzer.

According to a further research by the inventors, the air permeability S of the separator 3, the depth h of the recess 13, the thickness $H_{121}$ of the first sublayer 121, the thickness $H_{122}$ of the second sublayer 122 may satisfy 50 μm·sec/100 cc≤S×h×$H_{122}$/$H_{121}$≤15,000 μm·sec/100 cc, where S is in sec/100 cc, and h is in μm, so that a further improvement in the dynamics performance of the battery is facilitated while improving the safety and the cycle life of the battery. The reason for this is that the first coating 12 is of a multi-layer design including the first sublayer 121 and the second sublayer 122 (e.g., a dual-layer design composed of the first sublayer 121 and the second sublayer 122), and the battery cell that uses a dual-layer design and laser ablation technology generally has higher requirements for system dynamics, so that the air permeability of the separator 3 (representing the ability of air to pass through the material of the separator 3 per unit time, where the longer the time required for a unit flow of air to pass through the separator 3, the smaller the pore size of the separator 3, representing, to some extent, that the longer the time required for active ions such as lithium ions to be transmitted at the interface of the separator 3, which is detrimental to the transmission of the lithium ions) needs to match the thickness ratio of the second sublayer 122 to the first sublayer 121 of the first electrode plate (the thickness ratio of upper and lower coatings), the dimensions of the recess 13, etc., so as not to affect the dynamics performance of the battery. Therefore, synergistically regulating S, h, $H_{122}$, and $H_{121}$ such that they satisfy 3 μm·sec/100 cc≤S×h×$H_{122}$/$H_{121}$≤1000 μm·sec/100 cc can improve the safety, the cycle life and the dynamics performance of the battery.

By way of example, $S \times h \times H_{122}/H_{121}$ may be 50 μm·sec/100 cc, 80 μm·sec/100 cc, 100 μm·sec/100 cc, 200 μm·sec/100 cc, 300 μm·sec/100 cc, 400 μm·sec/100 cc, 500 μm·sec/100 cc, 600 μm·sec/100 cc, 700 μm·sec/100 cc, 750 μm·sec/100 cc, 800 μm·sec/100 cc, 900 μm·sec/100 cc, 1000 μm·sec/100 cc, 1500 μm·sec/100 cc, 2000 μm·sec/100 cc, 5000 μm·sec/100 cc, 8000 μm·sec/100 cc, 10,000 μm·sec/100 cc, 13,000 μm·sec/100 cc, 15,000 μm·sec/100 cc, or within a range consisting of any two thereof.

In some embodiments, 5 μm≤H122≤80 μm.

In some embodiments, 40 μm≤H121≤150 μm.

Specifically, 0.1≤H122/H121≤1. H122/H121 is for example 0.1, 0.15, 0.2, 0.25, 0.3, 0.4, 0.5, 0.6, 0.7, 0.8, 0.9, 1, or within a range consisting of any two thereof.

In some embodiments, the air permeability of the separator 3 ranges from 100 sec/100 cc to 550 sec/100 cc (i.e., 100≤S≤550), for example, 100 sec/100 cc, 150 sec/100 cc, 200 sec/100 cc, 250 sec/100 cc, 300 sec/100 cc, 350 sec/100 cc, 400 sec/100 cc, 450 sec/100 cc, 500 sec/100 cc, 550 sec/100 cc, or within a range consisting of any two thereof.

In some embodiments, the width L of the recess 13 may be from 50 μm to 160 μm, L being, for example, 50 μm, 80 μm, 100 μm, 130 μm, 150 μm, 160 μm, or within a range consisting of any two thereof.

In some embodiments, the depth h of the recess 13 may be from 3 μm to 40 μm, h being, for example, 3 μm, 3.5 μm, 5 μm, 10 μm, 15 μm, 20 μm, 25 μm, 30 μm, 35 μm, 40 μm, or within a range consisting of any two thereof.

In some embodiments, the spacing ΔL between the recesses 13 may be from 0.3 to 3 mm, for example, 0.3 mm, 0.5 mm, 0.8 mm, 1 mm, 1.3 mm, 1.6 mm, 2 mm, 2.5 mm, 3 mm, or within a range consisting of any two thereof, and from 0.3 mm to 1.6 mm.

Furthermore, the depth h of the recess 13 and the elongation at break e of the separator 3 may satisfy 4 μm≤h/e≤250 μm, where h is in μm, so that a further improvement in the safety and other performances of the battery is facilitated. The reason for this is that the adaption of the elongation at break e of the separator 3 to the depth h of the recess 13 can prevent the powder remaining in the recess 13 from puncturing the separator 3 when the recess 13 is formed by laser ablation or the like, and can also facilitate the separator 3 to be more fully filled in the recess 13 during the process of hot-pressing the first electrode plate 1, the separator 3 and the second electrode plate 2 into one piece, to increase the bonding force between the first electrode plate 1 and the separator 3, and to maintain the mechanical strength and other properties of the separator 3, thereby improving the structural stability of the battery cell, and improving the safety and other performances of the battery.

By way of example, h/e is, for example, 4 μm, 10 μm, 14 μm, 21 μm, 42 μm, 60 μm, 80 μm, 100 μm, 130 μm, 150 μm, 180 μm, 200 μm, 230 μm, 250 μm, or within a range consisting of any two thereof.

In some embodiments, the elongation at break e of the separator 3 may be from 10% to 100% (i.e., 10%≤e≤100%), e being, for example, 10%, 13%, 15%, 20%, 30%, 40%, 50%, 60%, 70%, 80%, 90%, 100% or within a range consisting of any two thereof.

In the embodiments of the disclosure, the first current collector 11 may include a copper foil, and may specifically include a carbon-coated copper foil. The carbon-coated copper foil is generally a copper foil with a carbon layer intermittently coated on its surface. Specifically, carbon coating may be performed on the surface of the copper foil by conventional equipment and processes in the field such as a gravure roller and intermittent coating equipment to form the carbon-coated copper foil. This is not particularly limited in the embodiments of the disclosure.

In the embodiments of the disclosure, it is possible that a surface on one side of the first current collector 11 is provided with the first coating 12, or surfaces on front and rear sides in the thickness direction of the first current collector 11 (front and rear side surfaces of the first current collector 11) are each provided with the first coating 12. When the surfaces on the two sides of the first current collector 11 are each provided with the first coating 12, the recesses 13 may be provided on the first coatings 12 on the two sides.

In the embodiments of the disclosure, the positive electrode current collector (second current collector 21) may include a conventional positive electrode current collector in the art, such as an aluminum foil, which is not particularly limited.

In the embodiments of the disclosure, it is possible that a surface on one side of the second current collector 21 is provided with the second coating 22, or surfaces on front and rear sides in the thickness direction of the second current collector 21 (front and rear side surfaces of the second current collector 21) are each provided with the second coating 22.

In an embodiment of the disclosure, the battery may be a lithium-ion battery.

In the embodiments of the disclosure, the positive electrode active material may include a conventional positive electrode active material in the art, including, for example, a positive lithium-containing active material, including, for example, one or more of lithium cobalt oxide, lithium manganese oxide, lithium nickel oxide, a ternary material, lithium iron phosphate, lithium manganese iron phosphate, lithium vanadium phosphate, lithium vanadium oxyphosphate, a lithium-rich manganese-based material, and lithium nickel cobalt manganese aluminum oxide. The ternary material may include lithium nickel cobalt manganese oxide and/or lithium nickel cobalt aluminum oxide.

In the embodiments of the disclosure, the binder in the positive electrode coating and the negative electrode coating may be a conventional bonding material in the art, including, for example, one or more of polyvinylidene fluoride (PVDF), vinylidene fluoride-hexafluoropropylene copolymer, polyamide, polyacrylonitrile (PAN), polyacrylate, polyacrylic acid (PAA), polyacrylate, polyvinylpyrrolidone, polyvinyl ether, polymethyl methacrylate, polytetrafluoroethylene, polyhexafluoropropylene and styrene-butadiene rubber (SBR). The polyacrylate may include lithium polyacrylate and/or sodium polyacrylate.

In addition, a thickener may also be included in the negative electrode coating. The thickener may include a thickener of carboxymethylcellulose (CMC) type, including, for example, carboxymethylcellulose and/or a carboxymethylcellulose salt. The carboxymethylcellulose salt includes, for example, lithium carboxymethylcellulose (CMC—Li) and/or sodium carboxymethylcellulose (CMC—Na).

In the embodiments of the disclosure, the conductive agent in the positive electrode coating and the negative electrode coating may be a conventional bonding material in the art, including, for example, one or more of a carbon nanotube (carbon tube), carbon black (SP), acetylene black, graphene, and conductive graphite.

In general, based on the total mass of the negative electrode coating (negative electrode active material layer), the mass fraction of the negative electrode active material may be from 70% to 99%, for example, 70%, 75%, 80%, 85%, 90%, 95%, 99%, or within a range consisting of any two thereof, the mass fraction of the conductive agent may be from 0.3% to 12%, for example, 0.3%, 0.5%, 1%, 3%, 5%, 8%, 10%, 12%, or within a range consisting of any two thereof, the mass fraction of the binder may be from 0% to 15%, for example, 0, 0.2%, 0.5%, 1%, 1.5%, 2%, 2.5%, 3%, 3.5%, 4%, 4.5%, 5%, 7%, 9%, 10%, 12%, 15%, or within a range consisting of any two thereof, and the mass fraction of the thickener may be from 0.05% to 3%, for example, 0.05%, 0.1%, 0.5%, 1%, 1.5%, 2%, 2.5%, 3%, or within a range consisting of any two thereof. However, this is not limited.

Furthermore, based on the total mass of the positive electrode coating (positive electrode active material layer), the mass fraction of the positive electrode active material may be from 70% to 99%, for example, 70%, 75%, 80%, 85%, 90%, 95%, 99%, or within a range consisting of any two thereof, the mass fraction of the conductive agent may be from 0.5% to 15%, for example, 0.5%, 1%, 1.5%, 2%, 2.5%, 3%, 3.5%, 4%, 4.5%, 5%, 7%, 9%, 10%, 12%, 15%, or within a range consisting of any two thereof, and the mass fraction of the binder may be from 0.5% to 15%, for example, 0.5%, 1%, 1.5%, 2%, 2.5%, 3%, 3.5%, 4%, 4.5%, 5%, 7%, 9%, 10%, 12%, 15%, or within a range consisting of any two thereof. However, this is not limited.

In the embodiments of the disclosure, the positive electrode plate may be prepared by a conventional method in the art such as a coating method. For example, the preparation process of the positive electrode plate may include: placing materials such as a positive electrode active material, a conductive agent and a binder in a solvent to prepare a positive electrode slurry, where the solvent used includes, for example, N-methylpyrrolidone (NMP), then applying the positive electrode slurry to a surface of a positive electrode current collector, and forming a positive electrode active material layer on the surface of the positive electrode current collector after drying, rolling and other processes, to prepare a positive electrode plate. During coating, a groove (slot) is reserved at a preset position of the positive electrode current collector to expose the surface of the positive electrode current collector. After the positive electrode active material layer is formed through coating, drying, rolling and other processes, a positive electrode tab is welded to the slot (the positive electrode tab is welded to the positive electrode current collector) by laser or ultrasonic welding.

In the embodiments of the disclosure, the negative electrode plate may be prepared by forming a negative electrode coating on a surface of a negative electrode current collector by a conventional method in the art such as a coating method, and then ablating a surface of the negative electrode coating by laser. For example, the process of the negative electrode plate may include: placing materials such as a negative electrode active material, a conductive agent and a binder in a solvent to prepare a negative electrode slurry, where the solvent used includes, for example, water, then applying the negative electrode slurry to a surface of a negative electrode current collector, forming a negative electrode active material layer on the surface of the negative electrode current collector after drying, rolling and other processes, and then forming a recess 13 in a predetermined region of a surface of the negative electrode active material layer by laser drilling, to prepare a negative electrode plate. During coating, a groove (slot) is reserved at a preset position of the negative electrode current collector to expose the surface of the negative electrode current collector. After the negative electrode active material layer is formed through coating, drying, rolling and other processes, and after the recess 13 is formed by laser ablation or the like in the surface of the negative electrode active material layer, a negative electrode tab is welded to the slot (the negative electrode tab is welded to the negative electrode current collector) by laser or ultrasonic welding, to prepare the negative electrode plate.

In the embodiments of the disclosure, a conventional laser drilling machine in the art is used for laser ablation.

In the embodiments of the disclosure, the battery further include an electrolyte that is injected into the encapsulation body to wet the battery cell.

In the embodiments of the disclosure, a conventional electrolyte in the art may be used. For example, the electrolyte includes a solvent, a solute, and an additive. The electrolyte may specifically be a non-aqueous electrolyte, where the solvent may include an organic solvent, and may specifically include a carbonate solvent, including, for example, one or more of ethylene carbonate (EC), ethyl methyl carbonate (EMC), diethyl carbonate (DEC), dimethyl carbonate (DMC), propylene carbonate (PC), and propyl propionate (PP); the additives may include one or more of vinylene carbonate (VC), fluoroethylene carbonate (FEC), diethyl sulfate (DTD), and 1,3-propane sultone (PS); and the solute may include a lithium salt. The lithium salt may include one or more of lithium hexafluorophosphate ($LiPF_6$), lithium bis(fluorosulfonyl)imide (LiFSI), lithium bis(trifluoromethylsulfonyl)imide (LiTFSI), etc.

In the embodiments of the disclosure, the base film 31 may include a polypropylene (PP) separator 3, a polyethylene (PE) separator 3, polypropylene/polyethylene (PP/PE) dual-layer composite film, a polyimide electrospun separator 33 (PI), a polypropylene/polyethylene/polypropylene (PP/PE/PP) three-layer composite film, or a cellulose non-woven separator 3 and other conventional separator 3 materials in the art.

In a specific implementation, it is possible to adjust parameters such as the air permeability of the separator 3 by adjusting conditions such as the production process of the base film 31 and the material of the base film 31. These are conventional operations in the art and will not be described in detail.

In the embodiments of the disclosure, the first adhesive layer 33 and the second adhesive layer 34 of the separator 3 may be formed of a conventional adhesive material in the art. For example, the first adhesive layer 33 includes a PVDF layer, and the second adhesive layer 34 includes a PVDF layer, the PVDF layer being formed primarily of PVDF. In the embodiments of the disclosure, an adhesive may be applied to the surfaces of the base film 31 by a conventional method in the art to form the first adhesive layer 33 and the second adhesive layer 34. This is not particularly limited.

In general, as shown in FIG. 5, the separator 3 includes a spacing portion 301 and an extension portion 302 connected to the spacing portion 301. The first electrode plate 1 is separated from the second electrode plate 2 by the spacing portion 301, and bonded to the first electrode plate 1 and the second electrode plate 2, respectively. The extension portion 302 is part of the separator 3 located on the innermost side of the wound battery cell, which part of the separator 3 is not bonded to the first electrode plate 1 and the second electrode plate 2. That is, at the head (innermost side) of the wound battery cell, there is a part of the separator 3 (i.e., the extension portion 302) that is not bonded to the first electrode plate 1 and the second electrode plate 2.

In the embodiments of the disclosure, a method for measuring the air permeability S of the separator 3 may include: disassembling a battery; obtaining a separator 3 sample to be measured from a battery cell (the separator 3 sample may specifically be a part of the separator 3 in the battery cell that is not bonded to the first electrode plate 1 and the second electrode plate 2, for example the extension portion 302 of the separator 3); and soaking the separator 3 sample in DMC for at least 2 hours, and then standing the separator sample in a room with a dew point of $\leq -35°$ for at least 2 hours, and then using a lithium battery separator 3 air permeability tester to measure the air permeability. Specifically, the measurement may be performed three times. The range of the three measurement results is guaranteed to be from 4 sec/100 cc to 6 sec/100 cc (e.g., about 5 sec/100 cc). The average value of the three measurement results is taken as the air permeability S of the separator 3.

In the embodiments of the disclosure, the battery may be prepared in accordance with a conventional method in the art. For example, the positive electrode plate 22, the separator 3 and the negative electrode plate 21 are stacked in sequence and hot-pressed into one piece, and then wound into a wound cell, which is then encapsulated in an encapsulation body. After liquid injection (injecting an electrolyte into the encapsulation body), formation, capacity grading, open-circuit voltage (OCV) testing, etc., the battery is prepared. These steps/procedures are all conventional operations in the art, are not specially limited in the disclosure, and will not be described in detail.

The disclosure is further described by means of examples below.

1. Preparation of Positive Electrode Plate

Lithium cobalt oxide, SP, and PVDF are mixed at a mass ratio of 97.6:1.4:1, and NMP is added and stirred evenly to prepare a positive electrode slurry. The positive electrode slurry is coated on front and rear surfaces of an aluminum foil having a thickness of 8 μm. After baking and rolling, positive electrode active material layers are formed on the front and rear surfaces of the aluminum foil to obtain a positive electrode plate with a thickness of about 81 μm.

During coating, a slot is reserved at a preset tab position on the aluminum foil to expose the surface of the aluminum foil. After the positive electrode active material layer is formed, a positive electrode tab is welded in the slot by laser or ultrasonic welding (that is, the positive electrode tab is welded to the aluminum foil exposed through the slot) to obtain a positive electrode plate.

2. Preparation of Negative Electrode Plate
   (1) A first negative electrode active material, SP, CMC—Li, PAA are mixed at a mass ratio of 97:0.4:0.1:2.5, and deionized water is added to prepare a first negative electrode slurry. The first negative electrode active material includes graphite and silicon carbon, where the mass ratio of silicon carbon to graphite (amount of doped silicon) n is 5%, the Si:C ratio of silicon carbon is 0.9, and the particle size D1 of the first negative electrode active material is 13 μm.
   (2) A second negative electrode active material, SP, CMC—Li, PAA are mixed in a mass ratio of 97:0.4:0.1:2.5, and deionized water is added to prepare a second negative electrode slurry. The second negative electrode active material includes graphite and silicon carbon, where the mass ratio of silicon carbon to graphite (amount of doped silicon) n is 5%, the Si:C ratio of silicon carbon is 0.9, and the particle size D2 of the second negative electrode active material is 8 μm.
   (3) The first negative electrode slurry and the second negative electrode slurry are simultaneously coated on front and rear surfaces of a carbon-coated copper foil having a thickness of 4 μm by a dual-layer coating method (during coating, an extrusion head for coating the second negative electrode slurry is located above an extrusion head for coating the first negative electrode slurry, so that a paste formed by the first negative electrode slurry is located between the carbon-coated copper foil and a paste formed by the second negative electrode slurry), and after baking and rolling, and negative electrode active material layers are formed on the front and rear surfaces of the carbon-coated copper foil (the negative electrode active material layers including a first sublayer formed by the first negative electrode slurry and a second sublayer formed by the second negative electrode slurry, and the first sublayer being located between the carbon-coated copper foil and the second sublayer).
   (4) Laser is used to ablate linear grooves (i.e., recesses, which do not penetrate the negative electrode active material layer) in the surface of the negative electrode active material layer on each side, where a spacing ΔL between recesses is equal to 1.2 mm, the width L of the recess is equal to 80 μm, and the depth h of the recess is equal to 15 μm, to prepare a negative electrode plate having a thickness of about 95 μm (the structural schematic view of the negative electrode plate is shown in FIGS. 1 and 3, and will not be described in detail here).

3. Preparation of Battery

The positive electrode plate and the negative electrode plate are slitted according to a preset shape and size. Then, the positive electrode plate, a separator, and the negative electrode plate are placed in sequence, wound, and hot-pressed into one piece to produce a wound cell (as shown in FIGS. 4 and 5). The separator includes a base film, a first adhesive layer located on a side of the base film facing the negative electrode plate, a ceramic layer located on a side of the base film facing away from the negative electrode plate, and a second adhesive layer located on a side of the ceramic layer facing the positive electrode plate. The thickness of the base film is 5 μm, the thickness H33 of the first adhesive layer is 1 μm, the thickness of the second adhesive layer is 1 μm, the air permeability S of the separator is equal to 200 sec/100 cc, and the elongation at break e of the separator is 70%. The ceramic layer is composed of ceramic particles (boehmite) and a third binder (PVDF) in a mass ratio of 99.5:0.5.

Then, the wound cell is encapsulated with an aluminum-plastic film, and then subjected to baking, electrolyte injection, formation, secondary encapsulation, sorting and OCV procedures in sequence, to prepare a lithium-ion battery having a thickness of 5.285 mm. A peel force between the positive electrode plate and the separator is 2 N/m, and the lithium salt in the electrolyte used is LiFP6.

The differences of Examples 2 to 34, Comparative Example 1, Comparative Example 2 and Comparative Example 3 from Example 1 are shown in Tables 1 and 2. Except for the differences shown in Tables 1 and 2, the remaining conditions are the same. Comparative Example 1 differs from Example 1 in that no ablation is performed on the surface of the negative electrode active material layer (i.e., the surface of the negative electrode active material layer is provided with no recess).

Example 35

1. Preparation of Positive Electrode Plate

Lithium cobalt oxide, SP, and PVDF are mixed in a mass ratio of 97.6:1.4:1, and NMP is added and stirred evenly to prepare a positive electrode slurry. The positive electrode slurry is coated on front and rear surfaces of an aluminum foil having a thickness of 8 μm. After baking and rolling, positive electrode active material layers are formed on the front and rear surfaces of the aluminum foil to obtain a positive electrode plate with a thickness of about 81 μm.

During coating, a slot is reserved at a preset tab position of the aluminum foil to expose the surface of the aluminum foil. After the positive electrode active material layer is formed, a positive electrode tab is welded in the slot by laser or ultrasonic welding (that is, the positive electrode tab is welded to the aluminum foil exposed through the slot) to obtain a positive electrode plate.

2. Preparation of Negative Electrode Plate
    (1) A first negative electrode active material, SP, CMC—Li, PAA are mixed in a mass ratio of 97:0.4:0.1:2.5, and deionized water is added to prepare a first negative electrode slurry. The first negative electrode active material includes graphite and silicon carbon, where the mass ratio of silicon carbon to graphite (amount of doped silicon) n is 5%, the Si:C ratio of silicon carbon is 0.9, and the particle size D1 of the first negative electrode active material is 13 μm.

3. Preparation of Battery

The positive electrode plate and the negative electrode plate are slitted according to a preset shape and size. Then, the positive electrode plate, a separator, and the negative electrode plate are placed in sequence, wound, and hot-pressed into one piece to produce a wound cell (as shown in FIGS. 4 and 5). The separator includes a base film, a first adhesive layer located on a side of the base film facing the negative electrode plate, a ceramic layer located on a side of the base film facing away from the negative electrode plate, and a second adhesive layer located on a side of the ceramic layer facing the positive electrode plate. The thickness of the base film is 5 μm, the thickness $H_{33}$ of the first adhesive layer is 1 μm, the thickness of the second adhesive layer is 1 μm, the air permeability S of the separator is equal to 200 sec/100 cc, and the elongation at break e of the separator is 70%. The ceramic layer is composed of ceramic particles (boehmite) and a third binder (PVDF) in a mass ratio of 99.5:0.5.

Then, the wound cell is encapsulated with an aluminum-plastic film, and then subjected to baking, electrolyte injection, formation, secondary encapsulation, sorting and OCV procedures in sequence, to prepare a lithium-ion battery having a thickness of 5.285 mm. A peel force between the positive electrode plate and the separator is 2 N/m, and the lithium salt in the electrolyte used is LiFP6.

The differences of Examples 36 to 40 from Example 35 are shown in Table 4. Except for the differences shown in Table 4, the remaining conditions are the same.

The negative electrode plate and the battery of each of the examples and the comparative examples are tested by the following methods, respectively, and the results are shown in Table 3.
    (1) A method for measuring the 5 C constant current charging rate is as follows. A battery is kept in a constant temperature room or incubator at 25° C. for 2 hours, and charged to an upper limit voltage at 0.2 C constant current and constant voltage, with a cut-off current of 0.02 C. After standing for 5 minutes, the battery is discharged to 3.0 V at 0.2 C. This charge-discharge process is cycled three times (3T), and the maximum capacity of the three times is an initial capacity C0 of the battery. The battery is then charged to the upper limit voltage at 5 C constant current and constant voltage, and the capacity C1 when charged to the upper limit voltage at 5 C constant current is recorded, where C1/C0 is the 5 C constant current charging rate of battery.
    (2) A method for measuring the voltage drop (i.e., the value of K measured in the OCV procedure during production of the battery) is as follows. After a sorted battery is stored in a high-temperature room at 45° C. for 48 to 60 hours, the battery is taken out and then stands in a constant-temperature room at 25° C. for 24 hours, whereupon the voltage V1 of the battery is measured. Upon standing in the constant-temperature room at 25° C. for 72 hours, the voltage V2 of the battery is measured, where the voltage drop=(V1−V2)/time interval between the two measurements, the time interval between the two measurements being approximately 80 h.

The depth h of the recess, the width L of the recess, the spacing ΔL between recesses, the thickness H31 of the base film, ΔL× H31, 2H33, h/2H33, the thickness H32 of the ceramic layer, ΔL× (H31+H32), the particle size Dv95 of the ceramic particles in the ceramic layer, L/Dv95, the air permeability S of the separator, S× L, the ratio H122/H121 of the thickness H122 of the second sublayer to the thickness H121 of the first sublayer, S×h×H122/H121, the mass ratio (amount of doped silicon) n of silicon carbon to graphite in the negative electrode active material layer, ΔL/(L× η), the Si:C ratio (a) of silicon carbon, a/h, the elongation at break e of the separator, and h/e in the various examples and comparative examples are summarized in Table 1. Except for the differences shown in Table 1, the remaining conditions are essentially the same.

TABLE 1

| Examples | h/ μm | L/ μm | ΔL/ mm | $H_{31}$/ μm | ΔL × $H_{31}$ | $2H_{33}$/ μm | h/ $2H_{33}$ | $H_{32}$/ μm | ΔL × ($H_{31}$ + $H_{32}$) |
|---|---|---|---|---|---|---|---|---|---|
| Example 1 | 15 | 80 | 1.2 | 5 | 6 | 2 | 7.5 | 2 | 8.4 |
| Example 2 | 15 | 80 | 0.3 | 4 | 1.2 | 2 | 7.5 | 2 | 1.8 |
| Example 3 | 15 | 80 | 0.3 | 5 | 1.5 | 2 | 7.5 | 2 | 2.1 |
| Example 4 | 15 | 80 | 3 | 5 | 15 | 2 | 7.5 | 2 | 21 |
| Example 5 | 15 | 80 | 3 | 5.5 | 16.5 | 2 | 7.5 | 2 | 22.5 |
| Example 6 | 15 | 80 | 3 | 5.5 | 16.5 | 2 | 7.5 | 3 | 25.5 |
| Comparative Example 1 | 0 | 0 | / | 5 | / | 2 | / | 2 | / |
| Example 7 | 15 | 80 | 0.5 | 5 | 2.5 | 2 | 7.5 | 2 | 3.5 |
| Example 8 | 5 | 80 | 1.2 | 5 | 6 | 2 | 2.5 | 2 | 8.4 |
| Example 9 | 3.5 | 80 | 1.2 | 5 | 6 | 2 | 1.75 | 2 | 8.4 |
| Example 10 | 30 | 80 | 1.2 | 5 | 6 | 2 | 15 | 2 | 8.4 |
| Example 11 | 30 | 80 | 1.2 | 5 | 6 | 2 | 15 | 2 | 8.4 |
| Example 12 | 35 | 80 | 1.2 | 5 | 6 | 0.5 | 70 | 2 | 8.4 |
| Example 13 | 30 | 80 | 1.2 | 5 | 6 | 0.5 | 60 | 2 | 8.4 |
| Example 14 | 3.5 | 80 | 1.2 | 5 | 6 | 4 | 0.875 | 2 | 8.4 |
| Example 15 | 30 | 80 | 1.2 | 4 | 4.8 | 2 | 15 | 2 | 7.2 |

TABLE 1-continued

| Examples | h/μm | L/μm | ΔL/mm | $H_{31}$/μm | ΔL × $H_{31}$ | $2H_{33}$/μm | h/$2H_{33}$ | $H_{32}$/μm | ΔL × ($H_{31}$ + $H_{32}$) |
|---|---|---|---|---|---|---|---|---|---|
| Example 16 | 30 | 80 | 1.2 | 4 | 4.8 | 2 | 15 | 2 | 7.2 |
| Example 17 | 1.5 | 80 | 1.2 | 4 | 4.8 | 2 | 0.75 | 2 | 7.2 |
| Example 18 | 3.5 | 80 | 1.2 | 4 | 4.8 | 2 | 1.75 | 2 | 7.2 |
| Example 19 | 15 | 80 | 1.2 | 4 | 4.8 | 2 | 7.5 | 2 | 7.2 |
| Example 20 | 15 | 50 | 1.2 | 4 | 4.8 | 2 | 7.5 | 2 | 7.2 |
| Comparative Example 2 | 15 | 50 | 1.2 | 4 | 4.8 | 2 | 7.5 | 2 | 7.2 |
| Example 21 | 15 | 150 | 1.2 | 4 | 4.8 | 2 | 7.5 | 2 | 7.2 |
| Example 22 | 15 | 150 | 1.2 | 4 | 4.8 | 2 | 7.5 | 2 | 7.2 |
| Comparative Example 3 | 15 | 160 | 1.2 | 4 | 4.8 | 2 | 7.5 | 2 | 7.2 |
| Example 23 | 15 | 80 | 0.3 | 5 | 1.5 | 2 | 7.5 | 2 | 2.1 |
| Example 24 | 15 | 80 | 0.5 | 5 | 2.5 | 2 | 7.5 | 2 | 3.5 |
| Example 25 | 10 | 50 | 1.2 | 5 | 6 | 2 | 5 | 2 | 8.4 |
| Example 26 | 10 | 50 | 1.6 | 5 | 8 | 2 | 5 | 2 | 11.2 |
| Example 27 | 15 | 80 | 1.2 | 5 | 6 | 2 | 7.5 | 2 | 8.4 |
| Example 28 | 30 | 80 | 1.2 | 5 | 6 | 2 | 15 | 2 | 8.4 |
| Example 29 | 15 | 80 | 1.2 | 5 | 6 | 2 | 7.5 | 2 | 8.4 |
| Example 30 | 8 | 50 | 1.2 | 5 | 6 | 2 | 7.5 | 2 | 8.4 |
| Example 31 | 5 | 45 | 1.2 | 5 | 6 | 2 | 7.5 | 2 | 8.4 |
| Example 32 | 35 | 150 | 1.2 | 5 | 6 | 2 | 7.5 | 2 | 8.4 |
| Example 33 | 35 | 150 | 1.2 | 5 | 6 | 2 | 7.5 | 2 | 8.4 |
| Example 34 | 40 | 160 | 1.2 | 5 | 6 | 2 | 7.5 | 2 | 8.4 |

TABLE 2

| Examples | Dv95/μm | L/Dv95 | S (sec/100 cc) | S × L | e | h/e | $H_{122}$/$H_{121}$ | S × h × $H_{122}$/$H_{121}$ |
|---|---|---|---|---|---|---|---|---|
| Example 1 | 0.3 | 266.7 | 200 | 16,000 | 70% | 21.429 | 0.25 | 750 |
| Example 2 | 0.3 | 266.7 | 200 | 16,000 | 70% | 21.429 | 0.25 | 750 |
| Example 3 | 0.3 | 266.7 | 200 | 16,000 | 70% | 21.429 | 0.25 | 750 |
| Example 4 | 0.3 | 266.7 | 200 | 16,000 | 70% | 21.429 | 0.25 | 750 |
| Example 5 | 0.3 | 266.7 | 200 | 16,000 | 70% | 21.429 | 0.25 | 750 |
| Example 6 | 0.3 | 266.7 | 200 | 16,000 | 70% | 21.429 | 0.25 | 750 |
| Comparative Example 1 | 0.3 | 0 | 200 | 0 | 70% | 21.429 | 0.25 | 750 |
| Example 7 | 0.3 | 266.7 | 200 | 16,000 | 70% | 21.429 | 0.25 | 750 |
| Example 8 | 0.3 | 266.7 | 200 | 16,000 | 100% | 5 | 0.25 | 250 |
| Example 9 | 0.3 | 266.7 | 200 | 16,000 | 100% | 3.5 | 0.25 | 175 |
| Example 10 | 0.3 | 266.7 | 200 | 16,000 | 10% | 300 | 0.25 | 1500 |
| Example 11 | 0.3 | 266.7 | 200 | 16,000 | 13% | 230.77 | 0.25 | 1500 |
| Example 12 | 0.3 | 266.7 | 200 | 16,000 | 70% | 50 | 0.25 | 1750 |
| Example 13 | 0.3 | 266.7 | 200 | 16,000 | 70% | 42.857 | 0.25 | 1500 |
| Example 14 | 0.3 | 266.7 | 200 | 16,000 | 70% | 5 | 0.25 | 175 |
| Example 15 | 0.3 | 266.7 | 450 | 36,000 | 50% | 60 | 1 | 13,500 |
| Example 16 | 0.3 | 266.7 | 550 | 44,000 | 50% | 60 | 1 | 16,500 |
| Example 17 | 0.3 | 266.7 | 100 | 8000 | 50% | 3 | 0.25 | 37.5 |
| Example 18 | 0.3 | 266.7 | 100 | 8000 | 50% | 7 | 0.25 | 87.5 |
| Example 19 | 0.3 | 266.7 | 100 | 8000 | 50% | 30 | 0.25 | 375 |
| Example 20 | 0.3 | 166.7 | 100 | 5000 | 50% | 30 | 0.25 | 375 |
| Comparative Example 2 | 0.3 | 166.7 | 80 | 4000 | 50% | 30 | 0.25 | 300 |
| Example 21 | 0.3 | 500 | 200 | 30,000 | 50% | 30 | 0.25 | 750 |
| Example 22 | 0.3 | 500 | 500 | 75,000 | 50% | 30 | 0.25 | 1875 |
| Comparative Example 3 | 0.3 | 533.3 | 500 | 80,000 | 50% | 30 | 0.25 | 1875 |
| Example 23 | 0.3 | 266.7 | 200 | 16,000 | 70% | 21.429 | 0.25 | 750 |
| Example 24 | 0.3 | 266.7 | 200 | 16,000 | 70% | 21.429 | 0.25 | 750 |
| Example 25 | 0.3 | 166.7 | 200 | 10000 | 70% | 14.286 | 0.25 | 500 |
| Example 26 | 0.3 | 166.7 | 200 | 10000 | 70% | 14.286 | 0.25 | 500 |
| Example 27 | 0.3 | 266.7 | 200 | 16,000 | 70% | 21.429 | 0.25 | 750 |
| Example 28 | 0.3 | 266.7 | 200 | 16,000 | 70% | 42.857 | 0.25 | 1500 |
| Example 29 | 2 | 40 | 200 | 16,000 | 70% | 21.429 | 0.25 | 750 |
| Example 30 | 2 | 25 | 200 | 10,000 | 70% | 21.429 | 0.25 | 750 |
| Example 31 | 2 | 22.5 | 200 | 9000 | 70% | 21.429 | 0.25 | 750 |
| Example 32 | 0.16 | 937.5 | 200 | 30,000 | 70% | 21.429 | 0.25 | 750 |
| Example 33 | 0.1 | 1500 | 200 | 30,000 | 70% | 21.429 | 0.25 | 750 |
| Example 34 | 0.1 | 1600 | 200 | 32,000 | 70% | 21.429 | 0.25 | 750 |

TABLE 3

| Examples | η | ΔL/(L × η) 0.015-3 | Si:C ratio | a/h (a = Si:C ratio) | 5C constant current charging rate | Voltage drop | Battery thickness/mm |
|---|---|---|---|---|---|---|---|
| Example 1 | 5% | 0.3 | 0.9 | 0.06 | 75% | 0.004 | 5.285 |
| Example 2 | 5% | 0.075 | 0.9 | 0.06 | 73% | 0.015 | 5.285 |
| Example 3 | 5% | 0.075 | 0.9 | 0.06 | 73% | 0.01 | 5.285 |
| Example 4 | 5% | 0.75 | 0.9 | 0.06 | 70% | 0.003 | 5.285 |
| Example 5 | 5% | 0.75 | 0.9 | 0.06 | 68% | 0.003 | 5.31 |
| Example 6 | 5% | 0.75 | 0.9 | 0.06 | 68% | 0.003 | 5.35 |
| Comparative Example 1 | 5% | / | 0.9 | 0.06 | 50% | 0.004 | 5.285 |
| Example 7 | 5% | 0.125 | 0.9 | 0.06 | 72% | 0.008 | 5.285 |
| Example 8 | 5% | 0.3 | 0.9 | 0.18 | 66% | 0.004 | 5.285 |
| Example 9 | 5% | 0.3 | 0.9 | 0.257 | 60% | 0.004 | 5.285 |
| Example 10 | 5% | 0.3 | 0.9 | 0.03 | 65% | 0.018 | 5.285 |
| Example 11 | 5% | 0.3 | 0.9 | 0.03 | 68% | 0.01 | 5.285 |
| Example 12 | 5% | 0.3 | 0.9 | 0.0257 | 69% | 0.015 | 5.21 |
| Example 13 | 5% | 0.3 | 0.9 | 0.03 | 69% | 0.008 | 5.21 |
| Example 14 | 5% | 0.3 | 0.9 | 0.257 | 60% | 0.004 | 5.385 |
| Example 15 | 5% | 0.3 | 0.9 | 0.03 | 68% | 0.005 | 5.235 |
| Example 16 | 5% | 0.3 | 0.9 | 0.03 | 65% | 0.005 | 5.235 |
| Example 17 | 5% | 0.3 | 0.9 | 0.6 | 62% | 0.005 | 5.235 |
| Example 18 | 5% | 0.3 | 0.9 | 0.257 | 64% | 0.005 | 5.235 |
| Example 19 | 5% | 0.3 | 0.9 | 0.06 | 72% | 0.005 | 5.235 |
| Example 20 | 5% | 0.48 | 0.9 | 0.06 | 70% | 0.005 | 5.235 |
| Comparative Example 2 | 5% | 0.48 | 0.9 | 0.06 | 55% | 0.005 | 5.235 |
| Example 21 | 5% | 0.16 | 0.9 | 0.06 | 75% | 0.007 | 5.235 |
| Example 22 | 5% | 0.16 | 0.9 | 0.06 | 75% | 0.007 | 5.235 |
| Comparative Example 3 | 5% | 0.15 | 0.9 | 0.06 | 73% | 0.02 | 5.235 |
| Example 23 | 30% | 0.0125 | 0.9 | 0.06 | 62% | 0.018 | 5.285 |
| Example 24 | 30% | 0.0208 | 0.9 | 0.06 | 66% | 0.008 | 5.285 |
| Example 25 | 1% | 2.4 | 0.9 | 0.09 | 74% | 0.003 | 5.285 |
| Example 26 | 1% | 3.2 | 0.9 | 0.09 | 72% | 0.0028 | 5.285 |
| Example 27 | 5% | 0.3 | 0.1 | 0.007 | 76% | 0.0035 | 5.285 |
| Example 28 | 5% | 0.3 | 0.1 | 0.003 | 78% | 0.003 | 5.285 |
| Example 29 | 5% | 0.3 | 0.1 | 0.007 | 74% | 0.003 | 5.285 |
| Example 30 | 5% | 0.48 | 0.1 | 0.007 | 70% | 0.003 | 5.285 |
| Example 31 | 5% | 0.533 | 0.1 | 0.007 | 65% | 0.003 | 5.285 |
| Example 32 | 5% | 0.16 | 0.1 | 0.007 | 80% | 0.005 | 5.285 |
| Example 33 | 5% | 0.16 | 0.1 | 0.007 | 80% | 0.007 | 5.285 |
| Example 34 | 5% | 0.15 | 0.1 | 0.007 | 82% | 0.015 | 5.285 |

As can be seen from Tables 1 to 3, with respect to Comparative Examples 1 to 3, in Examples 1 to 3, a recess is formed in the surface of the negative electrode active material layer, and the air permeability S of the separator and the width L of the recess are controlled to satisfy 5000≤S×L≤75,000, so that it is possible to increase the 5 C constant current charging rate of the battery, to improve the rate capability and the dynamics performance of the battery, while reducing the voltage drop of the battery and reducing the risk of short circuit, and also to increase the energy density of the battery while maintaining the thin thickness of the battery cell.

Further, with respect to Example 2 (ΔL× H31<2.1, and ΔL× (H31+H32)<2), Example 3 (ΔL× H31<2.1), Example 5 (ΔL× H31>15), Example 6 (ΔL×H31>15, and ΔL× (H31+H32)>25), Example 9 (h/e>4, and a/h>0.2), Example 10 (h/e>250), Example 12 (h/2H33>60), Example 14 (h/2H33<1, a/h>0.2), Example 16 (S×h×H122/H121>15,000), Example 17 (h/2H33<1, h/e<4, S×h×H122/H121<50, and a/h>0.2), Example 18 (a/h>0.2), Example 23 (ΔL× H31<2.1, and ΔL/(L× n)<0.015), Example 26 (ΔL/(L× η)>3), Example 28 (a/h<0.004), Example 31 (L/Dv95<25), Example 34 (L/Dv95>1500), Example 1, Example 4, Example 7, Example 8, Example 11, Example 13, Example 15, Example 19, Example 20, Example 21, Example 22, Example 24, Example 25, Example 27, Example 29, Example 30, Example 32, and Example 33, controlling 2.1≤ΔL× H31≤15, 2≤ΔL× (H31+H32)≤25, 4≤h/e≤250, 0.004≤a/h≤0.2, 1≤h/2H33≤60, 50≤S×h×H122/H121≤15,000, 0.015≤ΔL/(L× n)≤3, and 25≤L/Dv95≤1500 facilitates further taking into account both increasing the 5 C constant current charging rate of the battery (neither less than 66%) and reducing the voltage drop of the battery (neither more than 0.008), while maintaining the thin thickness of the battery cell. Moreover, a large amount of doped silicon can be maintained in the negative electrode active material layer, thereby increasing the battery capacity.

In addition, in Example 26, ΔL/(L× η)>3, and the amount of doped silicon thereof is small, so that the battery capacity is small. It can be seen in combination with Example 25 and Example 26 that when ΔL/(L× η) exceeds a certain range and is too large, the 5 C constant current charging rate of the battery will also show a downward trend. Therefore, taking these factors into account together, it is that 0.015≤ΔL/(L× n)≤3.

In addition, in Example 28, a/h<0.004. The silicon-carbon material in Example 28 has a low silicon content, so that the battery capacity is small. Moreover, the depth h of the recess in Example 28 is greater than the depth h of the recess in Example 32 and Example 33. Therefore, the energy density loss in Example 28 is larger than those in Example 32 and Example 33. Therefore, taking these factors into account together, it is that 0.004≤a/h≤0.2.

TABLE 4

| Examples | a (Si:C ratio) | a/h (a = Si:C ratio) | 5 C constant current charging rate | Voltage drop | Battery thickness/mm |
|---|---|---|---|---|---|
| Example 35 | 0.9 | 0.06 | 74% | 0.004 | 5.285 |
| Example 36 | 0.7 | 0.047 | 75.5% | 0.003 | 5.285 |
| Example 37 | 1.5 | 0.1 | 73% | 0.008 | 5.285 |
| Example 38 | 2.5 | 0.17 | 70% | 0.009 | 5.285 |
| Example 39 | 2.8 | 0.19 | 67% | 0.009 | 5.285 |
| Example 40 | 3 | 0.2 | 66% | 0.010 | 5.285 |

It should be finally noted that the foregoing embodiments are merely used for illustrating rather than limiting the technical solutions of the disclosure. Although the disclosure has been illustrated in detail with reference to the foregoing embodiments, it should be understood by those of ordinary skill in the art that the technical solutions described in the foregoing embodiments may still be modified, or some or all of the technical features thereof may be equivalently substituted; and these modifications or substitutions do not make the essence of the corresponding technical solution depart from the scope of the technical solutions of the embodiments of the disclosure.

What is claimed is:

1. A battery, comprising a first electrode plate and a separator, the first electrode plate comprising a first current collector and a first coating located on a surface of the first current collector, wherein the first coating is connected to the separator; and a surface of the first coating is provided with a recess, and an air permeability S of the separator and a width L of the recess satisfy: $5000\ \mu m \cdot sec/100\ cc \leq S \times L \leq 75{,}000\ \mu m \cdot sec/100\ cc$, wherein S is in $sec/100\ cc$ and L is in $\mu m$;
wherein the first electrode plate is a negative electrode plate, the first coating comprises a first active material, the first active material comprises a silicon-based material, the silicon-based material comprises a silicon-carbon material, and a mass ratio a of silicon to carbon of the silicon-carbon material and a depth h of the recess satisfy $0.004\ \mu m^{-1} \leq a/h \leq 0.2\ \mu m^{-1}$, wherein h is in $\mu m$.

2. The battery according to claim 1, wherein the first active material further comprises graphite;
a spacing $\Delta L$ between two adjacent recesses, the width L of the recess, and a mass ration of the silicon-based material to the graphite of the first coating satisfy $0.015 \leq \Delta L/(L \times n) \leq 3$, wherein $\Delta L$ is in mm, and L is in $\mu m$;
in the first active material, the mass ration of the silicon-based material to the graphite ranges from 1% to 30%;
the silicon-based material further comprises one or more of a silicon-oxygen material, elemental silicon, and a silicon alloy; and
the graphite comprises artificial graphite and/or natural graphite.

3. The battery according to claim 1, wherein $0.1 \leq a \leq 3$.

4. The battery according to claim 3, wherein $0.1 \leq a \leq 0.9$.

5. The battery according to claim 3, wherein $0.9 < a \leq 2.5$.

6. The battery according to claim 1, wherein the depth h of the recess and the elongation at break e of the separator satisfy $4\ \mu m \leq h/e \leq 250\ \mu m$, wherein h is in $\mu m$; and $10\% \leq e \leq 100\%$.

7. The battery according to claim 1, wherein the separator comprises a base film, and a spacing $\Delta L$ between two adjacent recesses and a thickness H31 of the base film satisfy $2.1 \times 10^{-3}\ mm^2 \leq \Delta L \times H31 \leq 15 \times 10^{-3}\ mm^2$, wherein $\Delta L$ is in mm and H31 is in $\mu m$;
the thickness $H_{31}$ of the base film ranges from 2 to 15 $\mu m$; and
the spacing $\Delta L$ between the two recesses ranges from 0.3 to 3 mm.

8. The battery according to claim 1, wherein the first coating is bonded to the separator;
the separator comprises a base film, and a first adhesive layer located on a side of the base film facing the first electrode plate;
the depth h of the recess and a thickness $H_{33}$ of the first adhesive layer satisfy $1 \leq h/2H_{33} \leq 60$; wherein $H_{33}$ is in $\mu m$;
the thickness $H_{33}$ of the first adhesive layer ranges from 0.25 to 2.5 $\mu m$.

9. The battery according to claim 1, wherein the battery further comprises a second electrode plate having an opposite polarity to the first electrode plate, the separator being located between the first electrode plate and the second electrode plate;
the second electrode plate is a positive electrode plate;
the separator comprises a base film, a first adhesive layer located on a side of the base film facing the first electrode plate, a ceramic layer located on a side of the base film facing away from the first electrode plate, and a second adhesive layer located on a side of the ceramic layer facing the second electrode plate; and
a thickness $H_{31}$ of the base film, a thickness $H_{32}$ of the ceramic layer and a spacing $\Delta L$ between two adjacent recesses satisfy: $2 \times 10^{-3}\ mm^2 \leq \Delta L \times (H_{31}+H_{32}) \leq 25 \times 10^{-3}\ mm^2$; wherein $\Delta L$ is in mm, and $H_{31}$ and $H_{32}$ are in $\mu m$.

10. The battery according to claim 9, wherein the thickness $H_{32}$ of the ceramic layer ranges from 0.5 to 5 $\mu m$;
the thickness $H_{31}$ of the base film ranges from 2 to 15 $\mu m$; and
the ceramic layer comprises ceramic particles and a third binder, the third binder comprising one or more of polyvinylidene fluoride, polyvinylidene fluoride-hexafluoropropylene copolymer, and polymethyl methacrylate.

11. The battery according to claim 1, wherein the separator comprises a base film, a first adhesive layer located on a side of the base film facing the first electrode plate, a ceramic layer located on a side of the base film facing away from the first electrode plate, and a second adhesive layer located on a side of the ceramic layer facing a second electrode plate; and
a particle size Dv95 of ceramic particles and the width L of the recess satisfy: $25 \leq L/Dv95 \leq 1500$; wherein the Dv95 is in $\mu m$.

12. The battery according to claim 11, wherein the particle size Dv95 of the ceramic particles ranges from 0.1 to 2 $\mu m$;
the ceramic particles of the ceramic layer have a percentage by mass of 50% to 99.8%; and
the ceramic particles comprise one or more of alumina, boehmite, magnesium oxide, magnesium hydroxide, and titanium oxide.

13. The battery according to claim 1, wherein
$100\ sec/100\ cc \leq S \leq 550\ sec/100\ cc$;
and/or the width L of the recess ranges from 50 $\mu m$ to 160 $\mu m$;
and/or the depth h of the recess ranges from 3 $\mu m$ to 40 $\mu m$;
and/or a spacing $\Delta L$ between recesses ranges from 0.3 to 3 mm.

14. The battery according to claim 1, wherein the surface of the first coating comprises at least one recess group, each recess group comprising at least two recesses distributed in a first direction;
- the surface of the first coating comprises at least two recess groups, the at least two recess groups being distributed in a second direction intersecting the first direction;
- a distance between the recesses of one recess group of two adjacent recess groups and the recesses of the other recess group in the second direction is less than or equal to 1 mm;
- the first direction is parallel to a length direction of the first coating; and
- the second direction is parallel to a width direction of the first coating.

15. The battery according to claim 1, wherein
the battery further comprises a positive electrode plate, the separator being located between the negative electrode plate and the positive electrode plate;
the negative electrode plate comprises at least one first flat region and a first bent region connected to the first flat region;
the positive electrode plate comprises at least one second flat region and a second bent region connected to the second flat region; and
the first flat region and the second flat region are arranged in a stack.

16. The battery according to claim 15, wherein the positive electrode plate is bonded to the separator; and a peel force between the positive electrode plate and the separator ranges from 1 to 20 N/m.

17. The battery according to claim 1, wherein the first coating comprises a first sublayer, and a second sublayer located on a side of the first sublayer facing away from the first current collector, a particle size Dv50 of the first active material in the first sublayer being greater than a particle size Dv50 of the first active material in the second sublayer;
- the particle size Dv50 of the first active material in the first sublayer ranges from 5 to 30 μm; and
- the particle size Dv50 of the first active material in the second sublayer ranges from 1 to 25 μm.

18. The battery according to claim 17, wherein the air permeability S of the separator, the depth h of the recess, a thickness $H_{121}$ of the first sublayer and a thickness $H_{122}$ of the second sublayer satisfy 50 μm·sec/100 cc≤S×h×$H_{122}$/$H_{121}$≤15,000 μm·sec/100 cc, wherein S is in sec/100 cc and h is in μm; and $H_{121}$ and $H_{122}$ are in μm.

19. The battery according to claim 17, wherein 0.1<$H_{122}$/$H_{121}$≤1, wherein the $H_{121}$ is a thickness of the first sublayer and the $H_{122}$ is a thickness of the second sublayer; the first active material in the first sublayer comprises graphite and/or the silicon-carbon material; and
- the first active material in the second sublayer comprises graphite and/or the silicon-carbon material.

\* \* \* \* \*